United States Patent
Takiyanagi

(10) Patent No.: US 9,471,251 B2
(45) Date of Patent: Oct. 18, 2016

(54) STORAGE SYSTEM, STORAGE CONTROL APPARATUS, INFORMATION PROCESSING APPARATUS, STORAGE CONTROL PROGRAM AND STORAGE CONTROL METHOD

(71) Applicant: NEC Corporation, Minato-ku, Tokyo (JP)

(72) Inventor: Masumi Takiyanagi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 33 days.

(21) Appl. No.: 14/536,847

(22) Filed: Nov. 10, 2014

(65) Prior Publication Data
US 2015/0143000 A1  May 21, 2015

(30) Foreign Application Priority Data

Nov. 15, 2013  (JP) .................................. 2013-236352

(51) Int. Cl.
| | | |
|---|---|---|
| G06F 13/12 | (2006.01) | |
| G06F 13/38 | (2006.01) | |
| G06F 3/06 | (2006.01) | |

(52) U.S. Cl.
CPC ............ *G06F 3/0656* (2013.01); *G06F 3/0608* (2013.01); *G06F 3/0611* (2013.01); *G06F 3/0683* (2013.01)

(58) Field of Classification Search
None
See application file for complete search history.

(56) References Cited

U.S. PATENT DOCUMENTS

| | | | | |
|---|---|---|---|---|
| 2002/0178336 | A1* | 11/2002 | Fujimoto | G06F 3/0611 711/165 |
| 2009/0003096 | A1* | 1/2009 | Kim | G11C 7/1045 365/194 |
| 2009/0073881 | A1* | 3/2009 | Cui | H04L 47/10 370/235 |
| 2009/0300314 | A1* | 12/2009 | LaBerge | G06F 13/1689 711/167 |

FOREIGN PATENT DOCUMENTS

| | | |
|---|---|---|
| JP | 08-249254 A | 9/1996 |
| JP | 10-240450 A | 9/1998 |
| JP | 2000-056992 A | 2/2000 |
| JP | 2001-312373 A | 11/2001 |
| JP | 2002-334049 A | 11/2002 |
| JP | 2012-003600 A | 1/2012 |

OTHER PUBLICATIONS

Japanese Office Action for JP Application No. 2013-236352 mailed on Sep. 29, 2015 with English Translation.

* cited by examiner

*Primary Examiner* — Elias Mamo

(57) ABSTRACT

A storage control method is characterized by receiving a write signal from an external transmission source, transmitting write data included in the write signal to a transmission destination, storing the write data temporarily, monitoring a temporary stored data amount that is an amount of the write data temporarily stored, transmitting a control signal, based on a result of the monitoring, to the transmission source which performs execution of the first processing, selecting second processing, based on the control signal, which is subject to be suppression of the execution from among the first processing according to a predetermined condition, outputting a suppression signal which suppresses the second processing, and suppressing execution of the second processing based on the suppression signal.

9 Claims, 13 Drawing Sheets

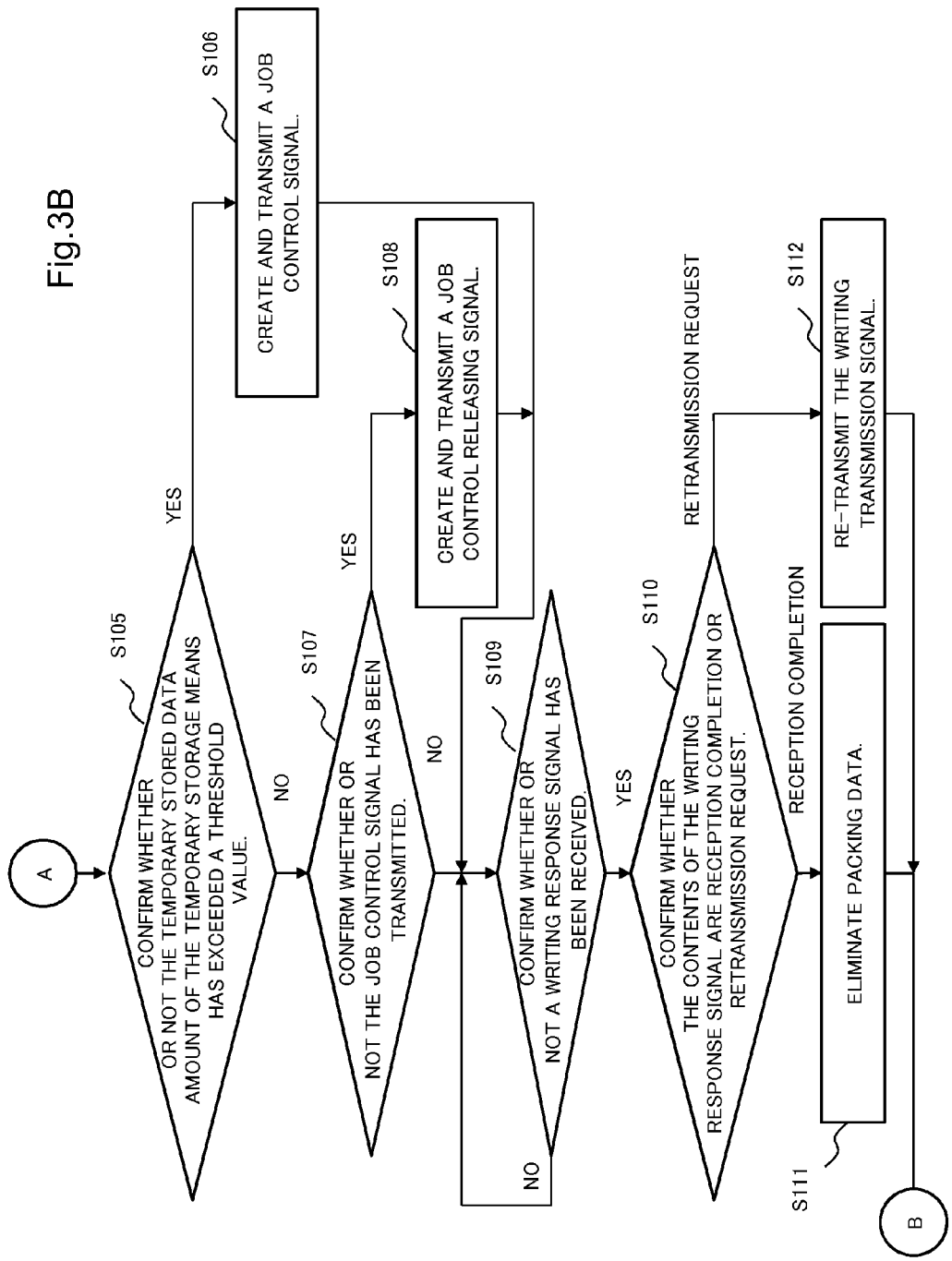

STORAGE SYSTEM, STORAGE CONTROL APPARATUS, INFORMATION PROCESSING APPARATUS, STORAGE CONTROL PROGRAM AND STORAGE CONTROL METHOD

This application is based upon and claims the benefit of priority from Japanese Patent Application No. 2013-236352, filed on Nov. 15, 2013, the disclosure of which is incorporated herein in its entirety by reference.

TECHNICAL FIELD

The present invention relates to a storage system, a storage control apparatus, an information processing apparatus, a storage control program and a storage control method which reduce deterioration in the processing capacity of the information processing apparatus.

BACKGROUND ART

In recent years, the value of information has been improving in line with development of the diffusion of IT (Information Technology) to corporations. The corporate management cannot be realized without the information such as customer information, business information and management information or the like. Therefore, it can be said that the information is now assets of the corporation.

In a storage apparatus which stores the above-mentioned information, protective measures such as backup of information or the like are applied. And, in order to secure the business continuity coping with disasters and acts of terrorism, the storage apparatuses are installed in remote locations in a dispersive way.

A memory storage which has high disaster tolerance, and is capable of data backup with "guaranteeing the orderliness" is disclosed by Japanese Patent Application Laid-Open No. 2012-003600 (it is hereinafter referred to as "patent document 1"). Here, "guaranteeing the orderliness" means that, when performing backup of a plurality of data, the order of the data is maintained, that is, information about the data order is maintained. For example, the orderliness of data is guaranteed when the data is stored so that the data is written in following the data order, and when reading the data, the data to be read is read in the order following the original data order. The memory storage described in patent document 1 stores the data which is stored in the first storage means also in the second storage means. The memory storage of patent document 1 includes a means configured to migrate the data which is stored in the second storage means to the third storage means, and a means configured to restore the data which has been migrated to the third storage means to the second storage means according to the status of use of the second storage means. Further, the memory storage of patent document 1 includes a means configured to output and store the data which is stored in the second storage means in a copy destination apparatus which is communicably connected to own apparatus.

That is, the memory storage of patent document 1 uses the first storage means as a main memory and uses the second storage means as a temporary memory when copying the data to the copy destination apparatus. The memory storage of patent document 1, according to the status of use of the second storage means, temporarily migrates the data stored in the second storage means to the third storage means, and restores the data having been migrated to the third storage means to an unused area of the second storage means.

The memory storage of patent document 1 avoids the excess in the storage capacity of the second storage means (a temporary memory), which is used when copying the data to the copy destination apparatus, by the third storage means (temporary migration).

A storage subsystem including a first storage subsystem which is connected with a plurality of host apparatuses, and a second storage subsystem which is connected with the first storage subsystem is disclosed by Japanese Patent Application Laid-Open No. 2002-334049 (it is hereinafter referred to as "patent document 2"). The storage subsystem of patent document 2 holds write data doubly in the first and second storage subsystems by copying the write data to the first storage subsystem from a host apparatus to the second storage subsystem.

In the first storage subsystem, a data buffer is provided for each of the host apparatuses and an "occupancy ratio" is calculated for each data buffer. Here, the "occupancy ratio" means the percentage of an amount of the write data which has not been copied to the second storage subsystem in the storage capacity of the data buffer. A threshold value for judging the amount of the write data which has not been copied is set for each data buffer.

When the occupancy ratio of any of the data buffers of the first storage subsystem has exceeded the threshold value, the first storage subsystem restricts inflow of the write data from the host apparatus corresponding to the data buffer in which the occupancy ratio has exceeded the threshold value.

Specifically, the first storage subsystem delays a response of writing completion to the write data from the host apparatus corresponding to the data buffer in which the occupation ratio has exceeded the threshold value.

That is, technology of patent document 2 restricts the inflow volume of the write data by delaying the response of writing completion and suppressing writing of the next data. In the technology of patent document 2, while restricting inflow of the write data, the data from the first storage subsystem is copied to the second storage subsystem. The technology of patent document 2 decreases the data volume of non-copied data in the data buffer, and restores from the state in which the occupancy ratio of the data buffer has exceeded the threshold value to the state in which the occupancy ratio does not exceed.

SUMMARY

The object of the present invention is to provide a storage system, a storage control apparatus, an information processing apparatus, a storage control program and a storage control method which can reduce deterioration in the processing capacity of the information processing apparatus.

A storage system, comprising:
a storage control apparatus which is provided with
a transmission device configured to transmit write data included in a write signal from an external transmission source to a transmission destination,
a temporary storage device configured to temporarily store the write data,
a monitor configured to monitor a temporary stored data amount that is an amount of the write data stored in the temporary storage device, and
a writing controller configured to receive the write signal, to output the write data to the transmission device, and to transmit a control signal to the transmission source based on a result of the monitoring; and
an information processing apparatus which is provided with a processing execution device configured to execute first processing and to transmit the write signal including the write data, and a processing controller configured to select, based on the control signal, second processing which is subject to be suppression of the execution from among the first processing according to a predetermined condition, and to output a suppression signal which suppresses execution of the second processing to the processing execution device.

A storage control apparatus, comprising:

a transmission device configured to transmit write data included in a write signal from an external transmission source to a transmission destination, wherein the external transmission source performing execution of first processing, selection of second processing, based on a control signal, which is subject to be suppression of the execution from among the first processing according to a predetermined condition, and suppression of execution of the second processing;

a temporary storage device configured to temporarily store the write data;

a monitor configured to monitor a temporary stored data amount that is an amount of the write data stored in the temporary storage device; and a writing controller configured to receive the write signal from the transmission source, to output the write data to the transmission device, and to transmit the control signal to the transmission source based on a result of the monitoring.

An information processing apparatus, comprising:

a processing execution device configured to execute first processing, and to transmit a write signal including write data; and a processing controller configured to select, based on a control signal from an external storage control apparatus, second processing which is subject to be suppression of the execution from among the first processing according to a predetermined condition, and to output a suppression signal which suppresses execution of the second processing to the processing execution device, wherein the external storage control apparatus including a transmission device configured to transmit the write data included in the write signal to a transmission destination, a temporary storage device configured to temporarily store the write data, a monitor configured to monitor a temporary stored data amount that is an amount of the write data stored in the temporary storage device, and a writing controller configured to receive the write signal and to output the write data to the transmission device, and to transmit the control signal to the transmission source based on a result of the monitoring.

A storage control program, which when executed by a computer provided in a storage control apparatus including a temporary storage device which temporarily stores write data included in a write signal from an external transmission source, causes the computer to operate as the storage control apparatus, the storage control apparatus comprising:

a transmission device configured to transmit the write data to a transmission destination;

a monitor configured to monitor a temporary stored data amount that is an amount of the write data stored in the temporary storage device; and a writing controller configured to receive the write signal from the transmission source, which performs execution of first processing, selection of second processing, based on a control signal, which is subject to be suppression of the execution from among the first processing according to a predetermined condition, and suppression of execution of the second processing, and to output the write data to the transmission device, and to transmit the control signal to the transmission source based on a result of the monitoring.

A storage control method, comprising:

receiving a write signal from an external transmission source;

transmitting write data included in the write signal to a transmission destination;

storing the write data temporarily;

monitoring a temporary stored data amount that is an amount of the write data temporarily stored;

transmitting a control signal, based on a result of the monitoring, to the transmission source which performs execution of the first processing;

selecting second processing, based on the control signal, which is subject to be suppression of the execution from among the first processing according to a predetermined condition;

outputting a suppression signal which suppresses the second processing; and suppressing execution of the second processing based on the suppression signal.

BRIEF DESCRIPTION OF THE DRAWINGS

Exemplary features and advantages of the present invention will become apparent from the following detailed description when taken with the accompanying drawings in which:

FIG. 3B. is a flowchart showing the remainder of the flowchart shown at FIG. 3A;

EXEMPLARY EMBODIMENT

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The exemplary embodiments of the present invention will be described in detail with reference to drawings below.

First Exemplary Embodiment

Figure 1:
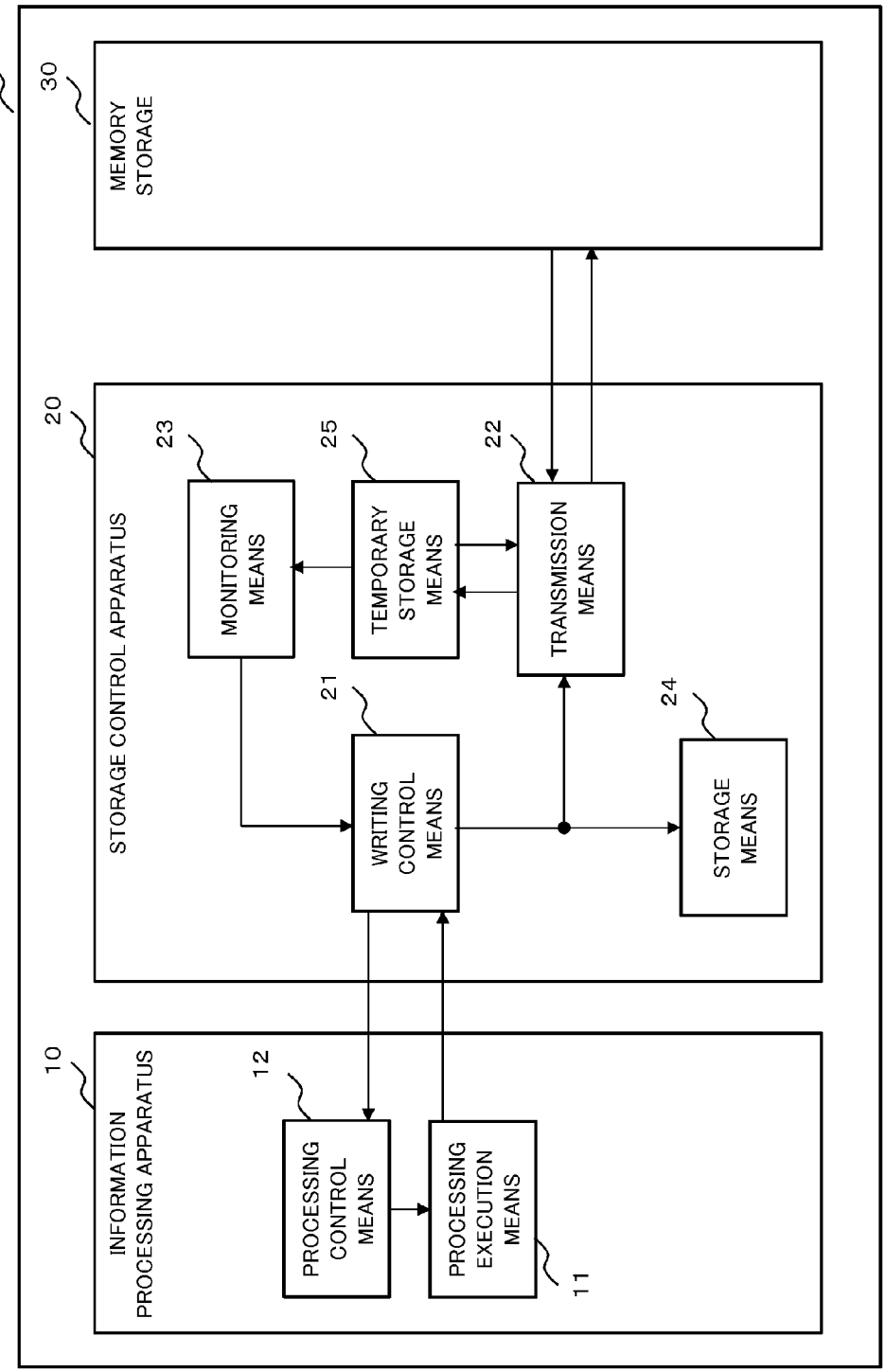
FIG. 1 is a block diagram showing an exemplary configuration of a storage system of a first exemplary embodiment of the present invention.

A first exemplary embodiment of the present invention will be described. FIG. 1 is a block diagram showing an exemplary configuration of a storage system 1 of this exemplary embodiment.

The configuration of the storage system 1 of the first exemplary embodiment will be described with reference to FIG. 1. The storage system 1 of this exemplary embodiment includes an information processing apparatus 10, a storage control apparatus 20 and a memory storage 30.

The information processing apparatus 10 includes a processing execution means 11 and a processing control means 12. The processing execution means 11 executes various processing, and transmits a write signal which includes write data generated in the processing to the storage control apparatus 20. The processing control means 12 performs predetermined control (it is hereinafter referred to as "execution control") which relates to execution of the processing by the processing execution means 11. The contents of the execution control will be described later.

The storage control apparatus 20 receives the write signal, and temporarily stores the write data included in the write signal. The storage control apparatus 20 creates a writing transmission signal by giving predetermined management information and transmission destination information to the write data which is temporarily stored, and transmits to the memory storage 30. The memory storage 30 receives the writing transmission signal, and stores the write data included in the writing transmission signal based on the management information of the writing transmission signal. The memory storage 30 creates a writing response signal which indicates that the writing transmission signal has been received, and transmits to the storage control apparatus 20. The storage control apparatus 20 receives the writing response signal, and eliminates the write data which was transmitted by the writing transmission signal corresponding to the writing response signal.

Figure 2:
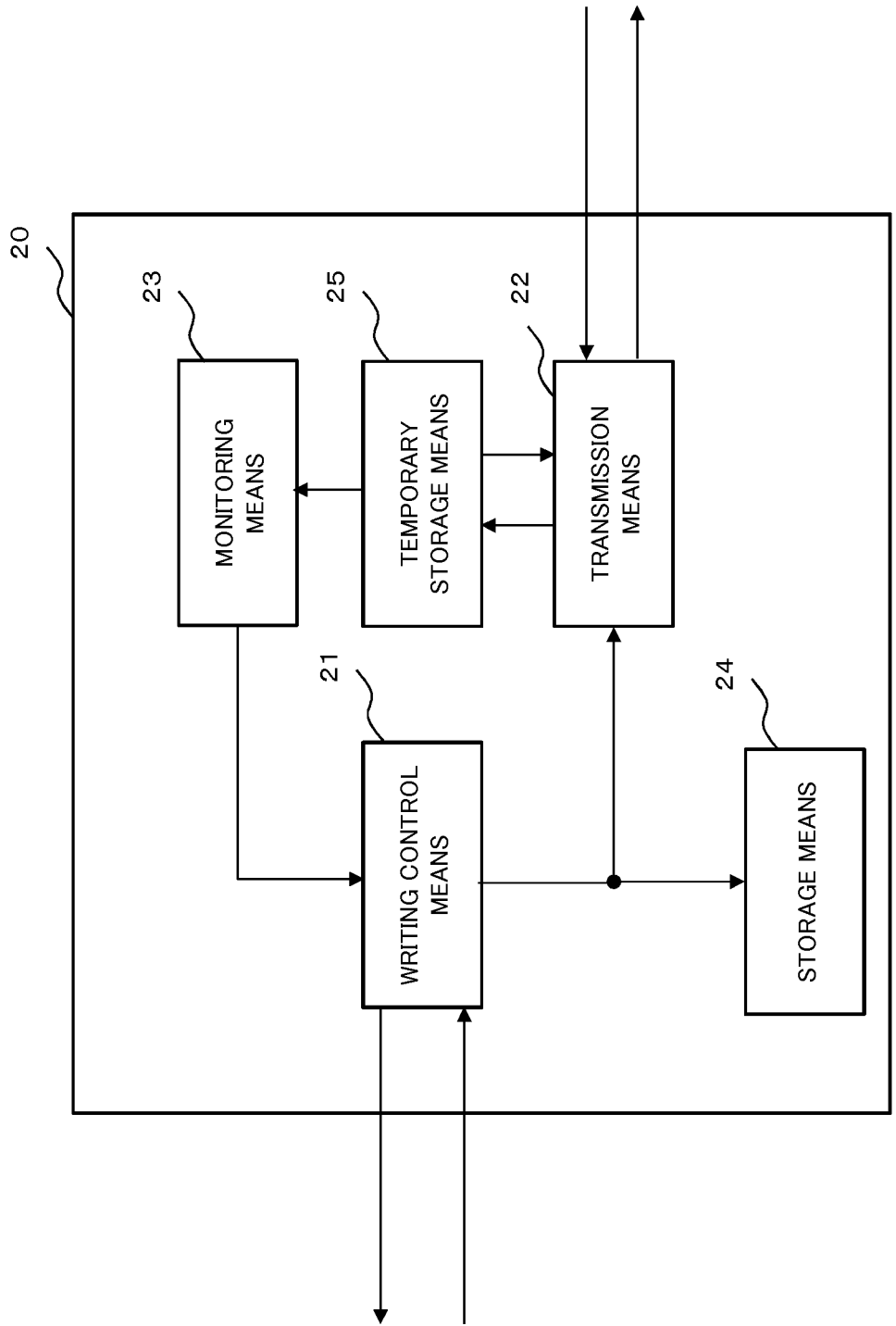
FIG. 2 is a block diagram showing an exemplary configuration of a storage control apparatus of the first exemplary embodiment of the present invention.

FIG. 2 is a block diagram showing an exemplary configuration of the storage control apparatus 20 of this exemplary embodiment. The configuration of the storage control apparatus 20 of this exemplary embodiment will be described with reference to FIG. 2. The storage control apparatus 20 includes a writing control means 21, a transmission means 22, a monitoring means 23, a storage means 24 and a temporary storage means 25.

The writing control means 21 receives the write signal from the information processing apparatus 10, and outputs the write data included in the write signal to the storage means 24 and the transmission means 22. The storage means 24 stores the write data. The transmission means 22 temporarily stores the write data in the temporary storage means 25. The temporary storage means 25 has a predetermined storage capacity (it is hereinafter referred to as "temporary storage capacity"). The transmission means 22 creates the writing transmission signal from the write data stored in the temporary storage means 25 (it is hereinafter referred to as "temporary stored data"), and transmits to the memory storage 30. The monitoring means 23 monitors a data amount of the temporary stored data (it is hereinafter referred to as "temporary stored data amount"), and outputs monitoring information obtained by the monitoring to the writing control means 21. Further, the contents of the writing transmission signal, monitoring and monitoring information will be described later.

Operation of the storage control apparatus 20 of this exemplary embodiment will be described with reference to FIG. 2. As mentioned above, the writing control means 21 outputs the write data included in the write signal to the storage means 24 and the transmission means 22. The storage means 24 stores the write data. The transmission means 22 temporarily stores the write data in the temporary storage means 25.

At that time, in order to secure the orderliness of the write data, the transmission means 22 temporarily stores the write data by performing "packing processing" for a predetermined data unit (it is hereinafter referred to as "a write data unit"). Here, the "packing processing" is processing which gives the management information such as a "time stamp" or "numbering" or the like to each write data unit in order to specify the orderliness of the write data unit. The write data is temporarily stored in the temporary storage means 25 as packing data in which the management information is given to each write data unit.

For example, the "time stamp" is a time when the packing processing of the write data unit is performed. For example, the "numbering" is a serial number generated successively when the packing processing of the write data unit is performed.

The transmission means 22 creates a "writing transmission signal" including the packing data, and transmits to the memory storage 30. Here, the "writing transmission signal" is a signal for storing the write data in the memory storage 30. The packing data and transmission destination information of the memory storage 30 are included in the writing transmission signal.

The transmission means 22 eliminates the packing data which was transmitted by the writing transmission signal from the temporary storage means 25 based on a "writing response signal" from the memory storage 30. Here, the "writing response signal" is a signal which informs the storage control apparatus 20 that the memory storage 30 has received the writing transmission signal.

The memory storage 30 stores the packing data based on the management information given to the packing data. When the management information given to the packing data is the numbering, for example, the memory storage 30 judges the orderliness of the packing data based on the number being numbered.

When judging that the number given to each packing data is proper as a sequence of the packing data, the memory storage 30 stores each packing data successively.

When judging that the number given to each packing data is not proper as a sequence of the packing data, the memory storage 30 rearranges each packing data based on the management information which is included in the received packing data, and stores each packing data successively. Further, when a missing number is found in each packing data based on the management information which is included in the received packing data, the memory storage 30 creates the writing response signal which requests resending of the writing transmission signal corresponding to the missing number, and transmits to the storage control apparatus 20. Further, when there is a reception error in the received writing transmission signal, the memory storage 30 creates the writing response signal which requests resending of the writing transmission signal for the reception error, and transmits to the storage control apparatus 20.

Accordingly, the memory storage 30 can store the write data based on the management information which is given to the packing data included in the writing transmission signal created by the transmission means 22.

The transmission means 22 receives the writing response signal from the memory storage 30, and confirms that the writing transmission signal has been received by the memory storage 30. The transmission means 22 eliminates the packing data, which was transmitted by the writing transmission signal, from the temporary storage means 25. Further, when the writing response signal is one which requests resending of the writing transmission signal, the transmission means 22 resends the writing transmission signal based on the writing response signal.

Thus, the temporary stored data amount of the temporary storage means 25 increases by inputting the write data from the writing control means 21, and decreases by receiving the writing response signal from the memory storage 30.

The monitoring means 23 monitors fluctuation of the temporary stored data amount of the temporary storage means 25. Specifically, the monitoring means 23 monitors whether or not the temporary stored data amount exceeds a threshold value which is set in advance to the temporary storage capacity of the temporary storage means 25. When detecting the temporary stored data amount having exceeded the above-mentioned threshold value, the monitoring means 23 outputs monitoring information including a detection result to the writing control means 21.

Further, if the above-mentioned monitoring is not performed, it cannot detect a situation that the temporary stored data amount reaches the temporary storage capacity of the temporary storage means 25. The temporary storage means 25 cannot temporarily store the write data from the writing control means 21 when the temporary stored data amount has reached the temporary storage capacity. Accordingly, it becomes a state that the storage control apparatus 20 cannot send and store the write data in the memory storage 30.

In order to prevent the above-mentioned state, as mentioned above, the monitoring means 23 monitors the temporary stored data amount of the temporary storage means 25.

The writing control means 21 transmits a "job control signal" to the information processing apparatus 10 based on the monitoring information from the monitoring means 23. Here, the "job control signal" is a signal which is used for execution control of a batch of processing (it is hereinafter referred to as "job") of each business being processed by the information processing apparatus 10. That is, when the information processing apparatus 10 receives the job control signal, the information processing apparatus 10 performs the execution control for the job which is being executed by the information processing apparatus 10. Here, the "execution control" means that, for example, "reducing the multiplexed number of jobs" relating to the jobs which include writing process, or "lowering the execution priority of jobs" with respect to the jobs which include writing process and permit execution delay.

Here, "reducing the multiplexed number of jobs" means that it reduces the number of a plurality of jobs which are being simultaneously processed by the information processing apparatus 10 (multiplicity) and include writing process to the storage control apparatus 20. For example, when the information processing apparatus 10 is dealing with jobs 1 to 6 simultaneously, the multiplexed number is reduced to 3 from 6 by stopping three among the jobs which are being processed simultaneously by the information processing apparatus 10.

Specifically, the processing control means 12 of the information processing apparatus 10 selects a job to be stopped according to a predetermined condition based on the job control signal. For example, the processing control means 12 selects three jobs which include writing process and started later. The processing control means 12 creates a suppression signal which designates the selected jobs, and outputs to the processing execution means 11. The processing execution means 11 suspends three jobs which are designated by the inputted suppression signal. As a result, the multiplexed number of jobs which include writing process and are executed by the processing execution means 11 is reduced.

The processing control means 12 lowers the occurrence frequency of writing instructions by reducing the number of simultaneous processing of jobs which include writing process. By lowering the occurrence frequency of writing instructions, the reception frequency in the storage control apparatus 20 that receives write signals from the processing execution means 11 of the information processing apparatus 10 goes down. By lowering the reception frequency of write signals, the temporary stored data amount of the temporary storage means 25 is reduced. That is, the transmission means 22 creates and transmits the writing transmission signal to the memory storage 30 while the execution control of jobs is being performed and the reception frequency of write signals is being lowered. The transmission means 22 receives the writing response signal from the memory storage 30, and reduces the temporary stored data amount.

Here, "lowering the execution priority of jobs" means that the execution priority given to each job which is processed by the information processing apparatus 10 is set to lower execution priority. The processing execution means 11 of the information processing apparatus 10 deals with jobs based on the execution priority given to each of the jobs. For example, it will describe a case where the processing execution means 11 is dealing with job 1 of the execution priority 2, and job 2 and job 3 of the execution priority 3. At that time, the processing control means 12 lowers the execution priority of jobs 1 from 2 to 1 and the execution priority of jobs 2 and job 3 from 3 to 2. The processing execution means 11 processes the jobs according to the execution priority of each of the jobs. Here, when a number of the priority is large, the execution priority is high.

According to a predetermined condition based on the job control signal, the processing control means 12 of the information processing apparatus 10 selects a job in which the execution priority is changed. For example, the processing control means 12 selects the job which includes writing process and permits execution delay. The processing control means 12 creates a suppression signal which designates the selected job, and outputs to the processing execution means 11. According to the inputted suppression signal, the processing execution means 11 lowers the execution priority of the job which permits execution delay, and leaves the execution priority as it is for the job which has high immediacy of processing and does not permit execution delay.

The processing control means 12 lowers the occurrence frequency of writing instructions by lowering the execution priority of the job which permits execution delay. By lowering the occurrence frequency of writing instructions, the reception frequency in the storage control apparatus 20 that receives write signals from the processing execution means 11 goes down. By lowering the reception frequency of write signals, the temporary stored data amount of the temporary storage means 25 is reduced. That is, the transmission means 22 creates and transmits the writing transmission signal to the memory storage 30 while the execution control of jobs is being performed and the reception frequency of write signals is being lowered. The transmission means 22 receives the writing response signal from the memory storage 30, and reduces the temporary stored data amount.

Thus, the job control signal is a signal which requests to perform the execution control of jobs, which suppresses the reception frequency of write signals by lowering the occurrence frequency of writing instructions based on the job being processed by the information processing apparatus 10.

Further, even when the execution control of jobs is being performed, the information processing apparatus 10 continues the processing of the job which does not include writing process and the job having high immediacy. Accordingly, the storage control apparatus 20 can reduce deterioration in the processing performance of the information processing apparatus 10. The storage control apparatus 20 can definitely store the write data included in the write signal in the memory storage 30.

That is, in the storage control apparatus 20, the threshold value is set to the temporary stored data amount so that it can cope with the reception frequency of write signals which occur by processing of the high immediacy jobs. The storage control apparatus 20, by detecting the temporary stored data amount of the temporary storage means 25 having exceeded the set threshold value, transmits the job control signal to the information processing apparatus 10. The information processing apparatus 10 performs the execution control of jobs according to the job control signal. The reception frequency of write signals from the information processing apparatus 10 is lowered by the execution control of jobs. Accordingly, the storage control apparatus 20 can definitely store the write data of the high immediacy jobs from the information processing apparatus 10 in the memory storage 30.

When detecting the temporary stored data amount of the temporary storage means 25 falling below the threshold value, the monitoring means 23 outputs the monitoring information including the detection result to the writing control means 21. The writing control means 21, based on the monitoring information, creates job control releasing information for releasing the execution control of jobs, and transmits to the information processing apparatus 10.

The processing control means 12 releases the execution control of jobs according to the job control releasing information. That is, the processing control means 12 restores the multiplexed number of jobs, or the execution priority of jobs or the like to the multiplexed number of jobs, or the execution priority of jobs or the like which are before performing the execution control of jobs.

FIG. 3 is a flowchart showing an example of operation of the storage control apparatus 20 of this exemplary embodiment. Operation of the storage control apparatus 20 will be described with reference to FIG. 3.

The writing control means 21 confirms whether or not the write signal from the information processing apparatus 10 has been received (S101).

When the reception of the write signal is not confirmed (S101: No), the writing control means 21 continues the processing of Step S101.

When confirming the reception of the write signal (S101: Yes), the writing control means 21 outputs the write data which is included in the received write signal to the storage means 24, and the storage means 24 stores the write data (S102). In a case when the temporary storage means 25 has stored the write data, the writing control means 21 judges, based on the monitoring information from the monitoring means 23, whether or not the temporary stored data amount reaches the temporary storage capacity (S103).

When it is revealed that the temporary stored data amount reaches the temporary storage capacity of the temporary storage means 25 by the above-mentioned confirmation of the temporary stored data amount (S103: Yes), the writing control means 21 creates an "urgent alarm signal". Here, the "urgent alarm signal" is a signal which notifies the information processing apparatus 10 of the temporary stored data amount of the temporary storage means 25 reaching the temporary storage capacity. And, the writing control means 21 transmits the urgent alarm signal to the information processing apparatus 10 (S113), and ends the writing process (End).

When it is revealed that the temporary stored data amount does not reach the temporary storage capacity of the temporary storage means 25 by the above-mentioned confirmation of the temporary stored data amount (S103: No), the writing control means 21 outputs the write data to the transmission means 22. The transmission means 22 performs the packing processing of the write data. The transmission means 22 stores the packing data in the temporary storage means 25 temporarily, creates the writing transmission signal including the packing data and the transmission destination information of the memory storage 30, and transmits to the memory storage 30 (S104).

The writing control means 21 confirms, based on the monitoring information of the monitoring means 23, whether or not the temporary stored data amount of the temporary storage means 25 has exceeded the predetermined threshold value due to temporary storage of the packing data (S105). When the temporary stored data amount has exceeded the set threshold value (S105: Yes), the writing control means 21 creates the job control signal, and transmits to the information processing apparatus 10 (S106). And, the writing control means 21 shifts to the processing of Step S109.

When the temporary stored data amount has not exceeded the set threshold value (S105: No), the writing control means 21 confirms whether or not the job control signal has been transmitted to the information processing apparatus 10 (S107). When the job control signal has been transmitted (S107: Yes), the writing control means 21 creates the job control releasing information for releasing the execution control of jobs and transmits to the information processing apparatus 10 (S108). And, the writing control means 21 shifts to the processing of next Step S109.

When the job control signal has not been transmitted (S107: No), the writing control means 21 confirms whether or not the transmission means 22 has received the writing response signal (S109). When the transmission means 22 has not received the writing response signal (S109: No), the writing control means 21 continues the processing of Step S109.

When the transmission means 22 has received the writing response signal (S109: Yes), the writing control means 21 confirms to the transmission means 22 whether the contents of the writing response signal are reception completion or retransmission request (S110).

When the contents of the writing response signal are reception completion (S110: reception completion), the transmission means 22 eliminates the packing data which was transmitted by the writing transmission signal corresponding to the writing response signal from the temporary storage means 25 (S111). And, the writing control means 21 returns to the processing of Step S101.

When the contents of the writing response signal are retransmission request (S110: retransmission request), the transmission means 22 retransmits the writing transmission signal based on the writing response signal (S112). And, the writing control means 21 returns to the processing of Step S101.

Thus, in the storage system 1 of this exemplary embodiment, the storage control apparatus 20 temporarily stores the write data included in the write signal from the information processing apparatus 10 by giving the predetermined management information, and transmits to the memory storage 30. The memory storage 30 judges the orderliness of the write data based on the management information given to the write data, and stores the write data. Accordingly, the storage system 1 of this exemplary embodiment can store the write data from the information processing apparatus 10 in the memory storage 30 without damaging the orderliness of the write data.

Further, the temporary stored data amount of the storage control apparatus 20 is monitored. When the temporary stored data amount has exceeded the predetermined threshold value, the storage control apparatus 20 requests the execution control of jobs to the information processing apparatus 10. The information processing apparatus 10 performs the execution control of jobs, which reduces the multiplexed number of jobs including writing process and lowers the execution priority of the job which permits execution delay. Accordingly, this exemplary embodiment lowers the reception frequency of write signals to the storage control apparatus 20 by carrying out the execution control of jobs, and reduces the temporary stored data amount. At that time, according to this exemplary embodiment, execution of processing of the job which does not include writing process and execution of processing of the job which has high immediacy and execution delay is not permitted are not affected. Therefore, the storage control apparatus 20 of this exemplary embodiment can store the write data relating to the job having high immediacy in the memory storage 30.

As above, the storage control apparatus 20 of this exemplary embodiment can reduce deterioration in the processing capacity relating to the job which has high immediacy and is processed by the information processing apparatus 10. The storage control apparatus 20 can store the write data from the information processing apparatus 10 in the memory storage 30.

Further, in the present invention, performing the packing processing for write data is not indispensable. That is, the write data included in the write signal may be stored in the temporary storage means of the storage control apparatus 20, and may be transmitted to the memory storage with included in the writing transmission signal. The write data is not necessarily transmitted with any management information being given as the packing processing. Accordingly, the function of packing processing of the transmission means 22 of the storage control apparatus 20 is not indispensable.

Further, in the present invention, it is not indispensable that the writing transmission signal is resent based on the writing response signal. That is, the writing transmission signal which includes the write data should be transmitted to the memory storage, but the writing transmission signal is not necessarily re-transmitted by receiving the writing response signal. Accordingly, the function of receiving the writing response signal of the transmission means 22 and the function of re-transmitting the writing transmission signal based on the writing response signal are not indispensable in the storage control apparatus 20.

Further, in the present invention, it is not indispensable to give notice of the urgent alarm signal to the information processing apparatus 10. That is, it may transmit the job control signal which requests the execution control of jobs to the information processing apparatus 10 from the writing control means 21 by detecting the temporary stored data amount exceeding the threshold value by the monitoring means 23 before the temporary stored data amount of the temporary writing means 25 exceeds the temporary storage capacity. The urgent alarm signal is not necessarily transmitted. Accordingly, the function of transmitting the urgent alarm signal by the writing control means 21 of the storage control apparatus 20 is not indispensable.

Further, in the present invention, it is not indispensable that the job control releasing information is outputted to the information processing apparatus 10. That is, the writing control means 21 may stop transmission of the job control signal by detection of the temporary stored data amount of the temporary storage means 25 falling below the threshold value by the monitoring means 23. The job control releasing information is not necessarily transmitted. Accordingly, the function of transmitting the job control releasing information by the writing control means 21 of the storage control apparatus 20 is not indispensable.

Figure 4:
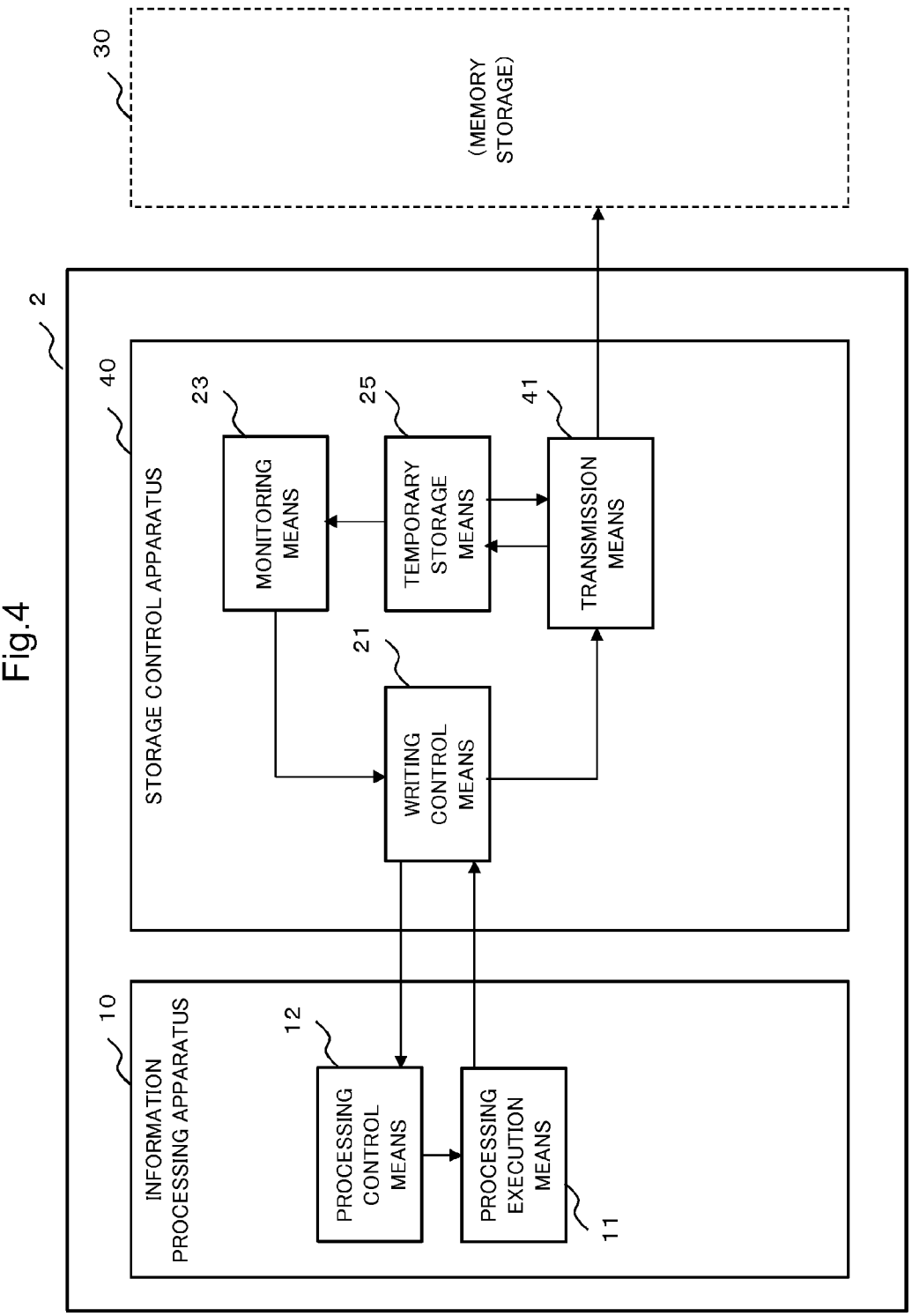
FIG. 4 is a block diagram showing the minimum configuration of the storage system of the first exemplary embodiment of the present invention.
Figure 5:
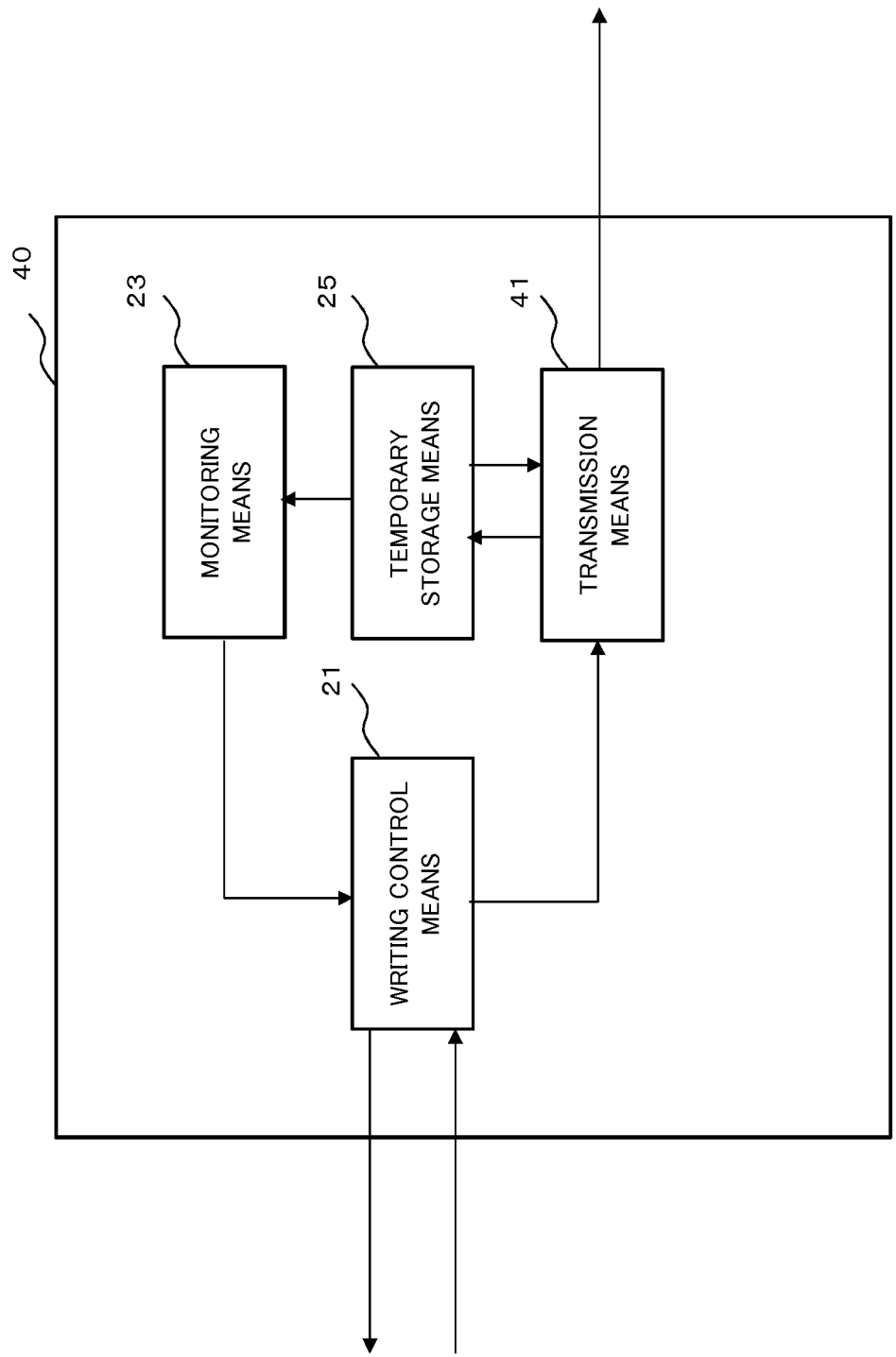
FIG. 5 is a block diagram showing the minimum configuration of the storage control apparatus of the first exemplary embodiment of the present invention.

FIG. 4 is a block diagram showing the minimum configuration of the storage system of the first exemplary embodiment of the present invention. FIG. 5 is a block diagram showing the minimum configuration of the storage control apparatus of the first exemplary embodiment of the present invention. The configuration of a storage system 2 and a storage control apparatus 40 of this exemplary embodiment will be described with reference to FIGS. 4 and 5.

The storage system 2 includes the information processing apparatus 10 and the storage control apparatus 40, and is connected with the memory storage 30 which is externally provided. The storage control apparatus 40 has a configuration identical with FIG. 2 except for a point that the transmission means 22 of the storage control apparatus 20 described in FIG. 2 is replaced by a transmission means 41 and the storage means 24 is not equipped. Accordingly, the same number and the same name are given to the configuration identical with FIG. 2 and description is omitted, and points of difference will be described.

The storage control apparatus 40 includes the writing control means 21, the transmission means 41, the monitoring means 23 and the temporary storage means 25. The storage control apparatus 40 is different from the storage control apparatus 20 described in FIG. 2 in a point that the writing control means 21 outputs the write data included in the write signal from the information processing apparatus 10 only to the transmission means 41, and does not transmit the urgent alarm signal and the job control releasing information, and in a point that the transmission means 41 does not perform the packing processing of the write data, reception of the writing response signal and re-transmission of the writing transmission signal. The transmission means 41 of the storage control apparatus 40 temporarily stores the write data in the temporary storage means 25.

The transmission means 41 temporarily stores the write data in the temporary storage means 25 and stores the write data in the memory storage 30 which is externally provided. Further, when the monitoring means 23 detects the temporary stored data amount of the temporary storage means 25 having exceeded the predetermined threshold value, the storage control apparatus 40 transmits the job control signal to the information processing apparatus 10, lowers the reception frequency of write signals and reduces the temporary stored data amount. At that time, according to this exemplary embodiment, execution of processing of the job which does not include writing process and execution of processing of the job which has high immediacy and execution delay is not permitted are not affected. Therefore, the storage control apparatus 40 of this exemplary embodiment can store the write data relating to the job having high immediacy in the memory storage 30.

Figure 6:
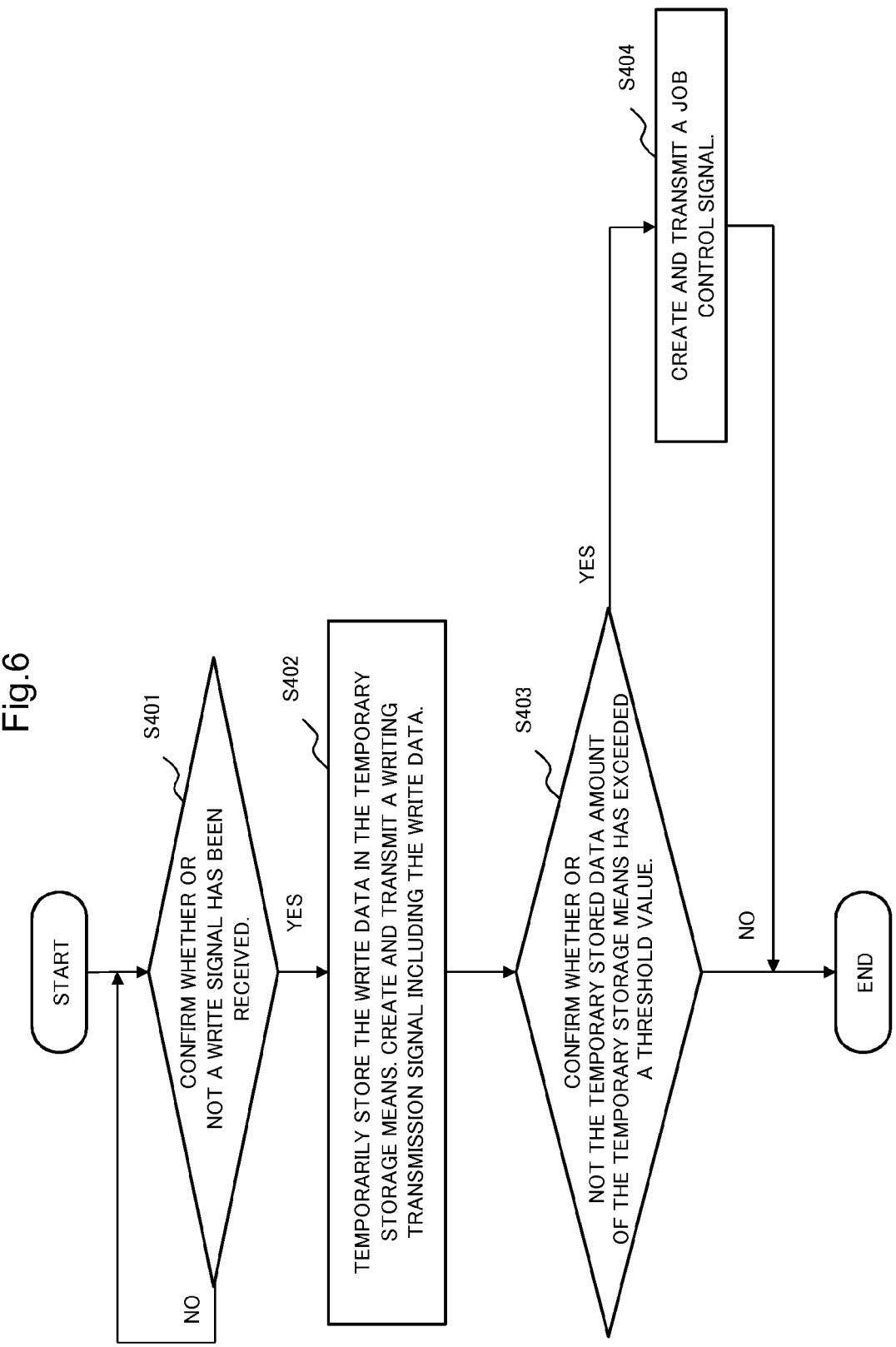
FIG. 6 is a flowchart showing an example of operation of the minimum configuration of the storage control apparatus of the first exemplary embodiment of the present invention.

FIG. 6 is a flowchart showing an example of operation of the storage control apparatus 40 which is shown in FIG. 5. Operation of the storage control apparatus 40 will be described with reference to FIG. 6.

The writing control means 21 confirms whether or not the write signal from the information processing apparatus 10 has been received (S401). When not confirming reception of the write signal (S401: No), the writing control means 21 continues the processing of Step S401. When confirming reception of the write signal (S401: Yes), the writing control means 21 outputs the write data which is included in the received write signal to the transmission means 41. The transmission means 41 stores the write data in the temporary storage means 24, creates the writing transmission signal including the write data, and transmits to the memory storage 30 which is externally provided (S402).

The writing control means 21 confirms, based on the monitoring information of the monitoring means 23, whether or not the temporary stored data amount of the temporary storage means 25 has exceeded the predetermined threshold value due to temporary storage of the write data (S403).

When the temporary stored data amount has exceeded the set threshold value (S403: Yes), the writing control means 21 creates the job control signal and transmits to the information processing apparatus 10 (S404). When the temporary stored data amount has not exceeded the set threshold value (S403: No), the writing control means 21 stops transmission of the job control signal.

Thus, the storage control apparatus 40 of this exemplary embodiment can reduce deterioration in the processing capacity relating to the job which has high immediacy and is processed by the information processing apparatus 10. The storage control apparatus 40 can store the write data from the information processing apparatus 10 in the memory storage 30.

Further, according to this exemplary embodiment, although the execution control of jobs has been explained as reducing the multiplexed number of jobs for which the information processing apparatus 10 is processing or lowering the execution priority of jobs, the execution control of jobs of the present invention is not limited to these.

For example, the processing control means 12 of the information processing apparatus 10 selects a job, which is a target of the execution control of jobs, started later and including writing process, from those jobs being processed by the processing execution means 11. The processing control means 12 outputs the suppression signal which designates the selected job to the processing execution means 11. The processing execution means 11 may provide a predetermined idle period after the writing instruction which is included in the processing of the job which is designated based on the suppression signal. At that time, the information processing apparatus 10 can lower the occurrence frequency of writing instructions by providing the idle period after the writing instruction.

That is, in the execution control of jobs, a target job of the execution control is selected from among those jobs being processed by the information processing apparatus 10 based on the execution priority and the required degree of high immediacy or the like. In the execution control of jobs, the occurrence frequency of writing instructions included in the processing of the selected job is lowered, and the transmission frequency of write signals is lowered. Accordingly, the target of the execution control of jobs may be such a job that causes the transmission frequency of write signals to be lowered, and the concrete contents of a method to select the target job are optional.

Further, in this exemplary embodiment, it has been explained that the write data is divided into the write data unit and the packing processing is performed. However, the write data of the present invention does not have to be divided when the packing processing is performed. The write data may be temporarily stored with the predetermined management information being given, and may be transmitted to the memory storage 30.

Figure 3A:
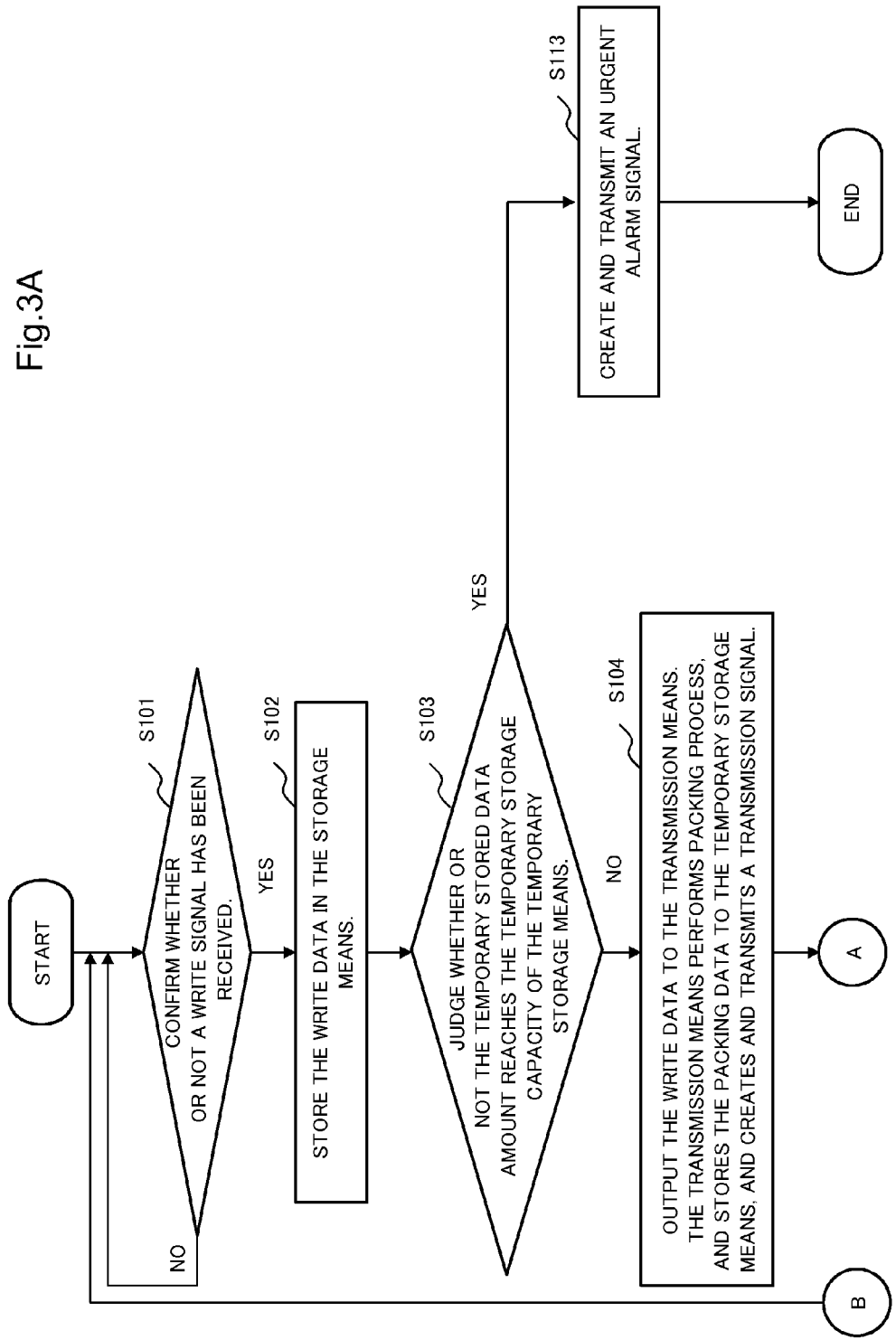
FIG. 3A. is a part of a flowchart showing an example of operation of the storage control apparatus of the first exemplary embodiment of the present invention.

Further, the flowcharts shown in FIG. 3A, 3B and FIG. 6 show as each of the examples of operation of the storage control apparatus 20 and the storage control apparatus 40 of this exemplary embodiment, and operation of the present invention is not limited to one shown in these flowcharts.

Second Exemplary Embodiment

Figure 7:
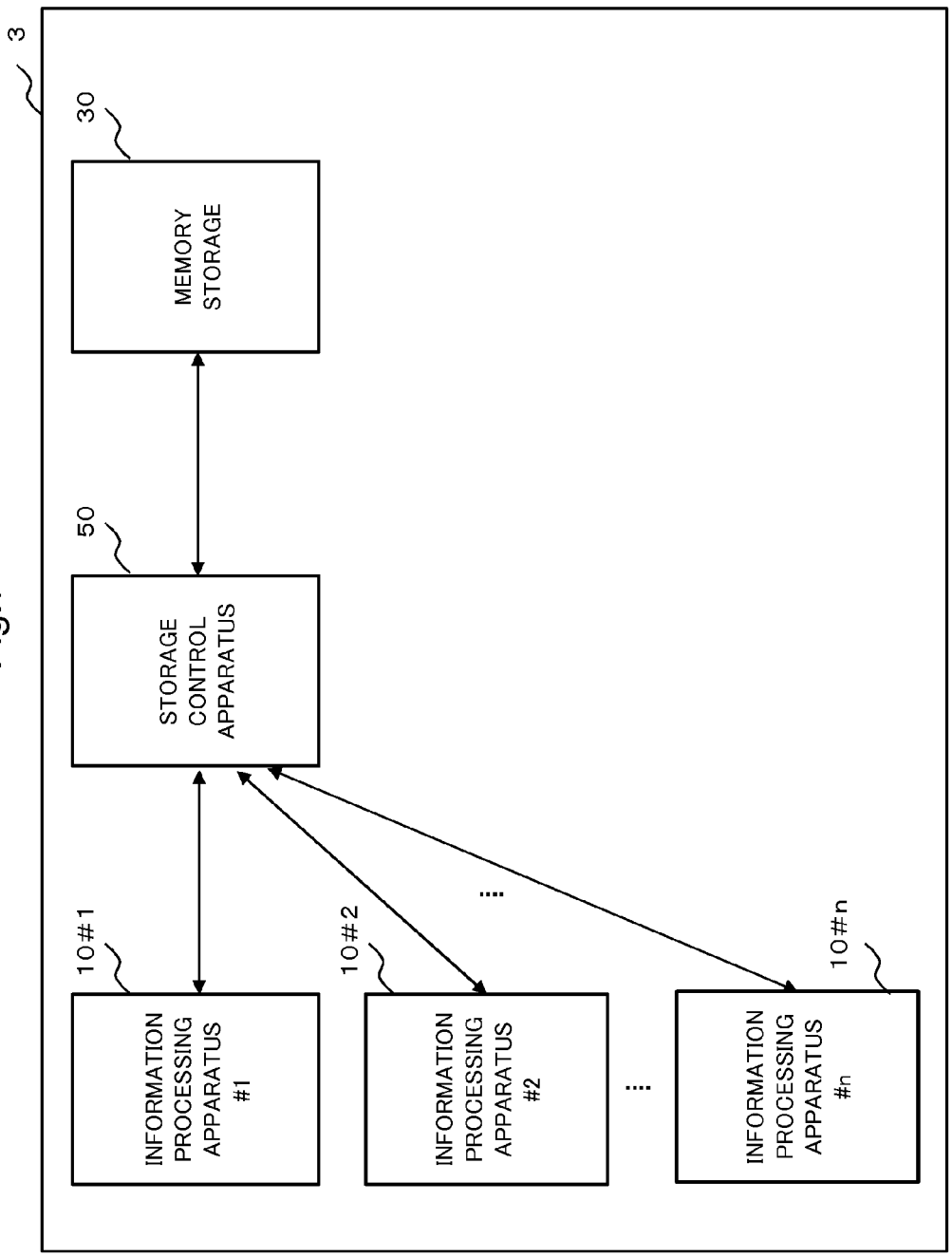
FIG. 7 is a block diagram showing an exemplary configuration of a storage system of a second exemplary embodiment of the present invention.
Figure 8:
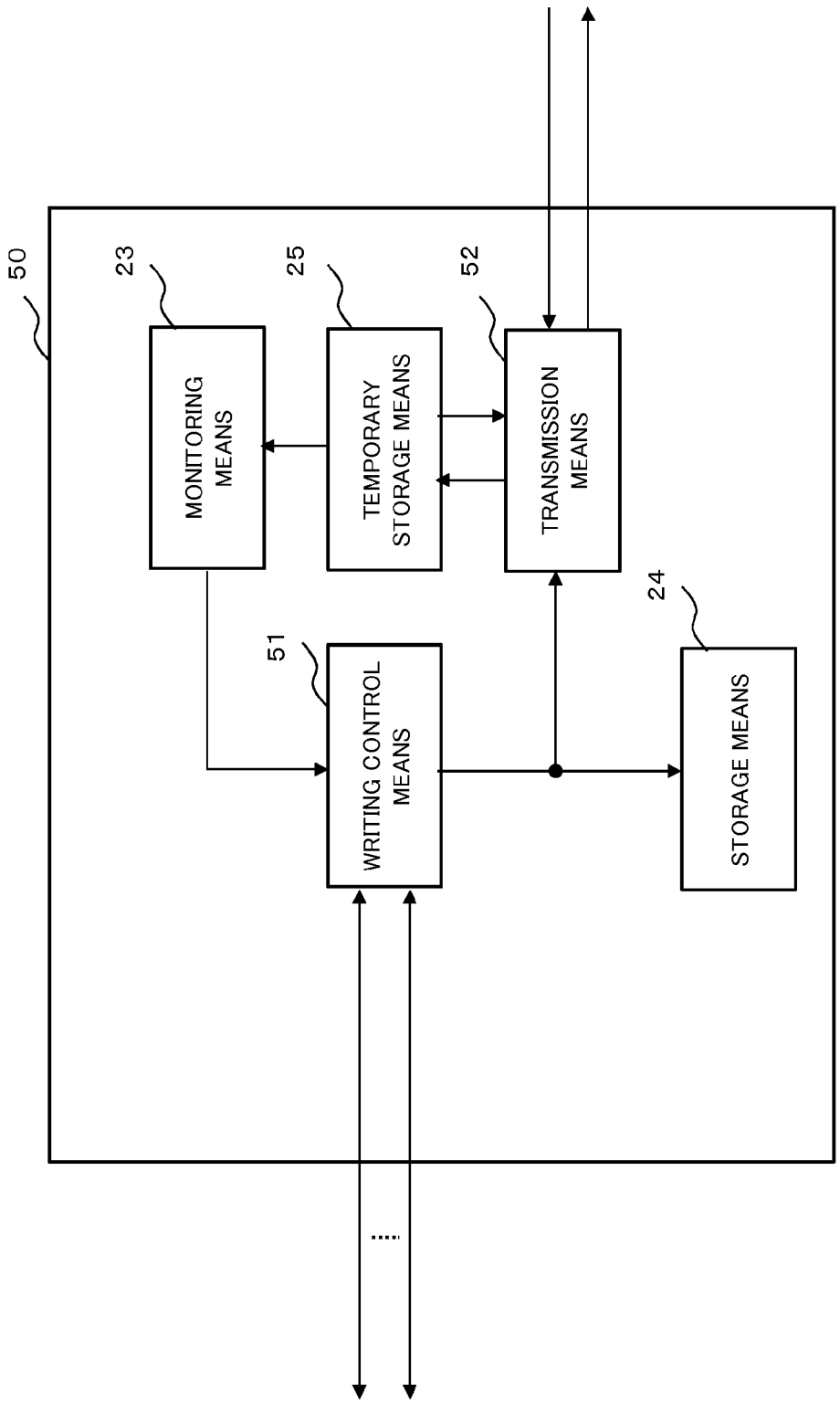
FIG. 8 is a block diagram showing an exemplary configuration of a storage control apparatus of the second exemplary embodiment of the present invention.

A second exemplary embodiment of the present invention will be described. FIG. 7 is a block diagram showing an exemplary configuration of a storage system 3 of this exemplary embodiment. FIG. 8 is a block diagram showing an exemplary configuration of a storage control apparatus 50 of this exemplary embodiment.

The configuration of the storage system 3 of this exemplary embodiment will be described with reference to FIG. 7.

The storage system 3 of this exemplary embodiment includes information processing apparatuses 10#1-10#n (n is an integer of 1 or more), a storage control apparatus 50 and a memory storage 30.

The information processing apparatuses 10#1-10#n output the write signals 1-$n$ to the storage control apparatus 50. The information processing apparatuses 10#1-10#n perform the execution control of jobs based on the job control signals 1-$n$ from the storage control apparatus 50. The information processing apparatus 10#1 performs the execution control of jobs based on the job control signal 1, and the information processing apparatus 10#n performs the execution control of jobs based on the job control signal n.

The storage control apparatus 50 receives the write signals 1-$n$ from the information processing apparatuses 10#1-10#n and stores the write data 1-$n$. The storage control apparatus 50 transmits the writing transmission signals 1-$n$ including the write data 1-$n$ to the memory storage 30.

The memory storage 30 receives and stores the writing transmission signals 1-$n$ from the storage control apparatus 50.

The configuration and operation of the storage control apparatus 50 of this exemplary embodiment will be described with reference to FIG. 8. The storage control apparatus 50 has a configuration identical with FIG. 2 except for a point that the writing control means 21 and the transmission means 22 of the storage control apparatus 20 described in FIG. 2 are replaced by a writing control means 51 and a transmission means 52. Accordingly, the same number and the same name are given to the configuration identical with FIG. 2 and description is omitted, and points of difference will be described.

The storage control apparatus 50 includes the writing control means 51, the transmission means 52, the monitoring means 23, the storage means 24 and the temporary storage means 25. The writing control means 51 receives the write signals 1-*n* from the information processing apparatuses 10#1-10#*n*, and outputs the write data 1-*n* included in the write signals 1-*n* to the storage means 24 and the transmission means 52. The storage means 24 stores the write data 1-*n*. The transmission means 52 temporarily stores the write data 1-*n* in the temporary storage means 25.

At that time, in order to secure the respective orderliness of the write data 1-*n*, the transmission means 52 performs the packing processing for each write data unit and temporarily stores in the temporary storage means 25. The transmission means 52 creates the writing transmission signals 1-*n* including the packing data 1-*n* with a transmission destination of the memory storage 30. That is, the transmission means 52 creates each of the writing transmission signals 1-*n* having a transmission destination of the memory storage 30, and transmits to the memory storage 30. The transmission means 52 receives the writing response signals 1-*n* from the memory storage 30 and eliminates the packing data 1-*n* from the temporary storage means 25. For example, the transmission means 52 receives the writing response signal m (m is an integer of 1 or more, and n or less) from the memory storage 30 and eliminates the packing data m, which was transmitted by the writing transmission signal m corresponding to the writing response signal m, from the temporary storage means 25.

Thus, the storage control apparatus 50 stores the write data 1-*n* included in the write signals 1-*n* of the information processing apparatuses 10#1-10#*n* in the storage means 24 and the memory storage 30.

Further, when the monitoring means 23 detects the temporary stored data amount of the temporary storage means 25 having exceeded the predetermined threshold value, the storage control apparatus 50 transmits the job control signals 1-*n* to the information processing apparatuses 10#1-10#*n* and lowers the reception frequency of write signals, and reduces the temporary stored data amount. At that time, according to this exemplary embodiment, execution of processing of the job which does not include writing process and execution of processing of the job which has high immediacy and execution delay is not permitted are not affected. Therefore, the storage control apparatus 50 of this exemplary embodiment can store the write data relating to the job having high immediacy in the memory storage 30.

As above, the storage control apparatus 50 of this exemplary embodiment can reduce deterioration in the processing capacity relating to the job which has high immediacy and is processed by the information processing apparatuses 10#1-10#*n*. The storage control apparatus 50 can store the write data 1-*n* from the information processing apparatuses 10#1-10#*n* in the memory storage 30.

Third Exemplary Embodiment

Figure 9:
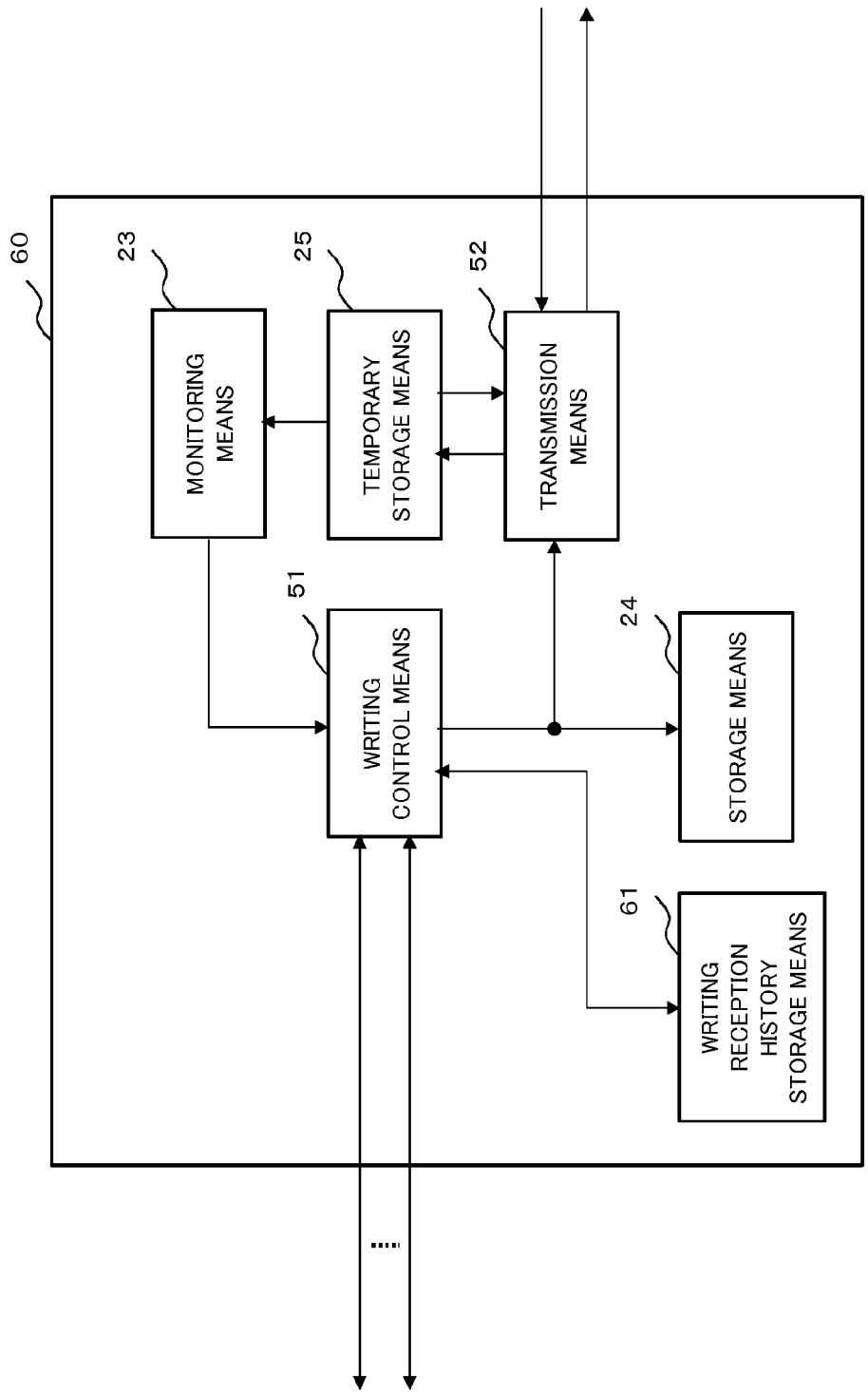
FIG. 9 is a block diagram showing an exemplary configuration of a storage control apparatus of a third exemplary embodiment of the present invention.

A third exemplary embodiment of the present invention will be described. FIG. 9 is a block diagram showing an exemplary configuration of a storage control apparatus 60 of this exemplary embodiment.

The configuration and operation of the storage control apparatus 60 of this exemplary embodiment will be described with reference to FIG. 9. The storage control apparatus 60 has a configuration identical with FIG. 8 except for a point that the writing reception history storage means 61 is added to the storage control apparatus 50 described in FIG. 8. Accordingly, the same number and the same name are given to the configuration identical with FIG. 8 and description is omitted, and points of difference will be described.

The writing reception history storage means 61 stores writing reception information and process control information as "writing reception history information". The writing reception information indicates a reception state of write signals such as the write data amount 1-*n* of the write signals 1-*n* which the writing control means 51 has received from the information processing apparatuses 10#1-10#*n*, and the reception frequencies 1-*n* of the write signals 1-*n*. The process control information indicates an implementation state of the execution control of jobs such as transmission results of the job control signals 1-*n* and the job control releasing signals 1-*n*.

The writing control means 51 selects an information processing apparatus 10 as a transmission destination of the job control signal from among the information processing apparatuses 10#1-10#*n* based on the writing reception history information stored in the writing reception history storage means 61. The writing control means 51 transmits the job control signal to the selected information processing apparatus 10.

For example, the writing control means 51 may select the information processing apparatus 10#m (m is an integer of 1 or more, and n or less), in which the reception frequency of write signals stored in the writing reception history storage means 61 is exceeding a predetermined frequency, and may transmit the job control signal m. Or, the writing control means 51 may transmit the job control signal by selecting the information processing apparatus 10#k (k is an integer of 1 or more, and n or less) in which the write data amount of write data stored in the writing reception history storage means 61 is exceeding a predetermined threshold value.

Or, based on the reception frequency of write signals in every operation time zone and the write data amount of write data of the information processing apparatuses 10#1-10#*n*, the writing control means 51 may stop transmission of the job control signal to the information processing equipment 10 in which the reception frequency is high in the daytime and the write data amount is small. Further, based on the reception frequency of write signals in every operation time zone and the write data amount of write data of the information processing apparatuses 10#1-10#*n*, the writing control means 51 may stop transmission of the job control signal to the information processing equipment 10 in which the write data amount is large in the night. That is, the writing control means 51 can give priority to the processing of the information processing apparatus 10 which needs a reply in real time in the daytime, and can preferentially handle the processing of the information processing apparatus 10 which performs batch processing of a large amount of write data in the night.

Thus, the storage control apparatus 60 stores the write data 1-*n* included in the write signals 1-*n* of the information processing apparatuses 10#1-10#*n* in the storage means 24 and the memory storage 30.

Further, when the monitoring means 23 detects the temporary stored data amount of the temporary storage means 25 having exceeded the predetermined threshold value, the storage control apparatus 60 selects an information processing apparatus 10, to which the job control signal is transmitted, from among the information processing apparatuses 10#1-10#*n* based on the writing reception history information stored in the writing reception history storage means 61. The storage control apparatus 60 transmits the job control signal to the selected information processing apparatus 10 and causes the selected information processing apparatus 10 to perform the execution control of jobs. It is possible for the storage control apparatus 60 to lower the reception frequency of write signals and to reduce the temporary stored data amount efficiently by causing the selected information processing apparatus 10 to perform the execution control of jobs. At that time, according to this exemplary embodiment, execution of processing of the job which does not include writing process and execution of processing of the job which has high immediacy and execution delay is not permitted are not affected. Therefore, the storage control apparatus 60 of this exemplary embodiment can store the write data relating to the job having high immediacy in the memory storage 30.

As above, the storage control apparatus 60 of this exemplary embodiment can reduce deterioration in the processing capacity relating to the job which has high immediacy and is processed by the information processing apparatuses 10#1-10#*n*. The storage control apparatus 60 can store the write data 1-*n* from the information processing apparatuses 10#1-10#*n* in the memory storage 30.

Fourth Exemplary Embodiment

Figure 10:
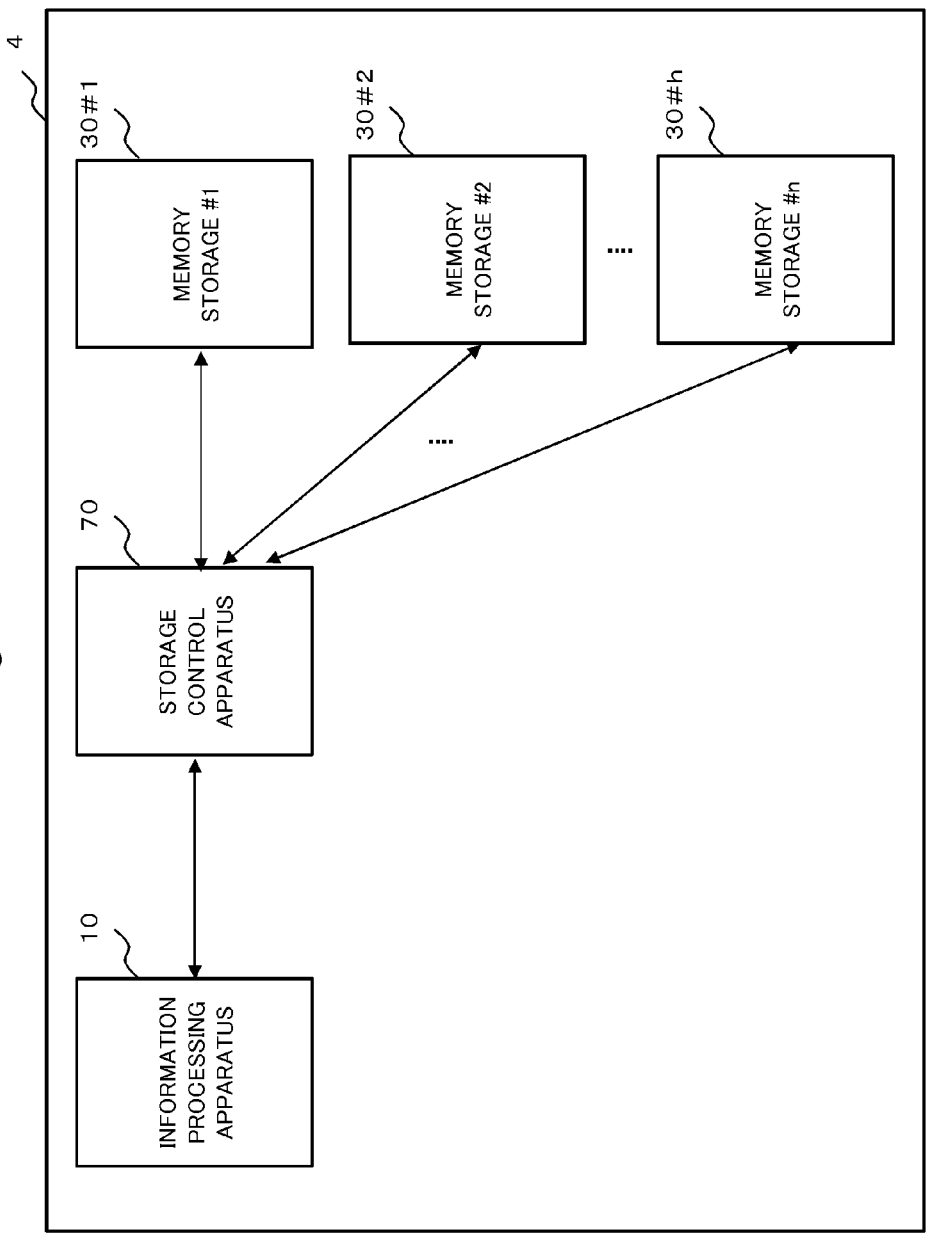
FIG. 10 is a block diagram showing an exemplary configuration of a storage system of a fourth exemplary embodiment of the present invention.
Figure 11:
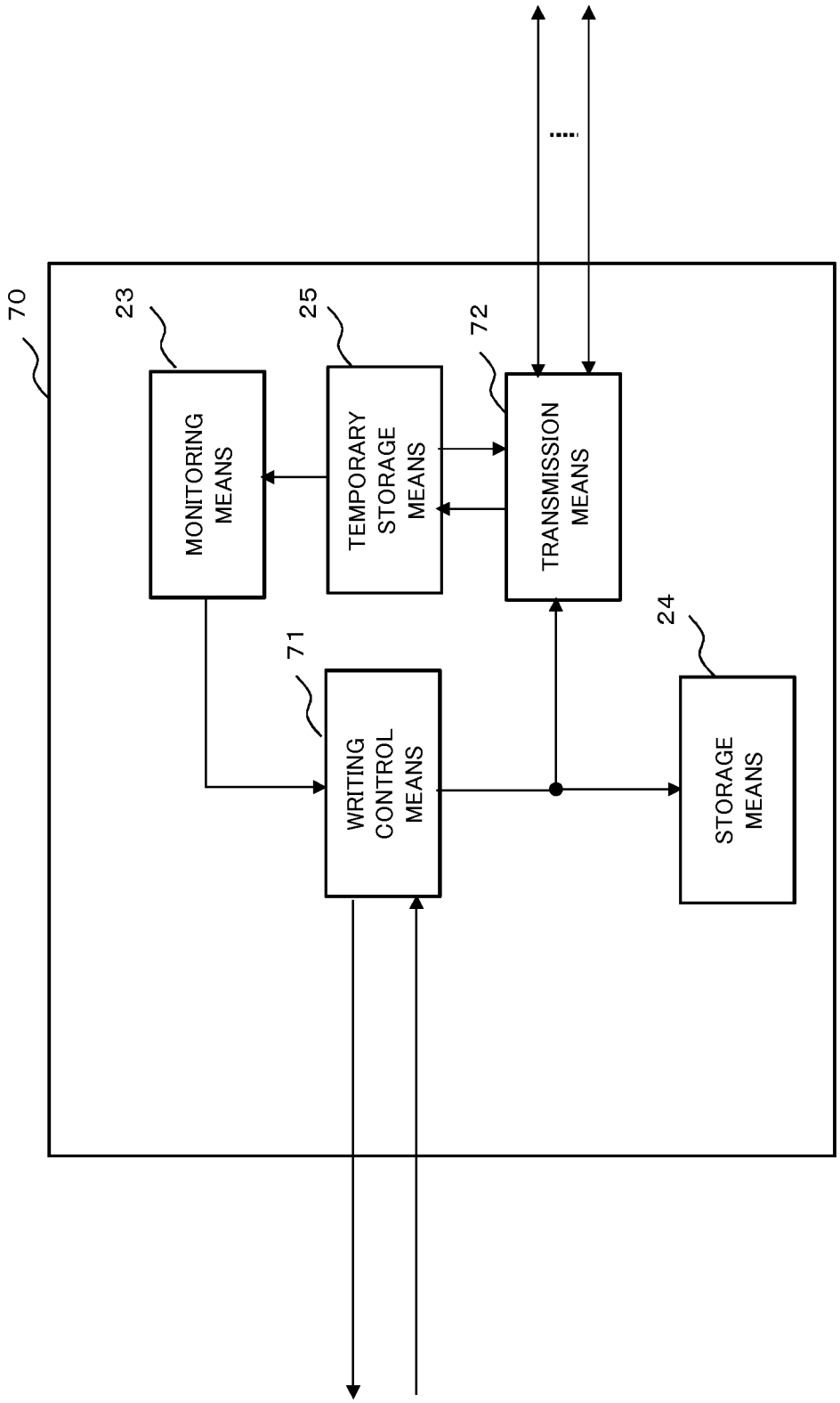
FIG. 11 is a block diagram showing an exemplary configuration of a storage control apparatus of the fourth exemplary embodiment of the present invention.

A fourth exemplary embodiment of the present invention will be described. FIG. 10 is a block diagram showing an exemplary configuration of the storage system 4 of this exemplary embodiment. FIG. 11 is a block diagram showing an exemplary configuration of a storage control apparatus 70 of this exemplary embodiment.

The configuration of the storage system 4 of this exemplary embodiment will be described with reference to FIG. 10.

The storage system 4 of this exemplary embodiment includes an information processing apparatus 10, a storage control apparatus 70 and memory storages 30#1-30#*h* (h is an integer of 1 or more).

The information processing apparatus 10 transmits the write signal to the storage control apparatus 70. The information processing apparatus 10 performs the execution control of jobs based on the job control signal from the storage control apparatus 70.

The storage control apparatus 70 receives the write signal from the information processing apparatus 10, and stores the write data. The storage control apparatus 70 transmits the writing transmission signals 1-*h* including the write data to the memory storages 30#1-30#*h*.

The memory storages 30#1-30#*h* receive and store the writing transmission signals 1-*h* from the storage control apparatus 70. The memory storage 30#1 receives and stores the writing transmission signal 1, and the memory storage 30#*h* receives and stores the writing transmission signal h.

The configuration and operation of the storage control apparatus 70 of this exemplary embodiment will be described with reference to FIG. 11. The storage control apparatus 70 has a configuration identical with FIG. 2 except for a point that the writing control means 21 and the transmission means 22 of the storage control apparatus 20 described in FIG. 2 are replaced by a writing control means 71 and a transmission means 72. Accordingly, the same number and the same name are given to the configuration identical with FIG. 2 and description is omitted, and points of difference will be described.

The storage control apparatus 70 includes the writing control means 71, the transmission means 72, the monitoring means 23, the storage means 24 and the temporary storage means 25. The writing control means 71 receives the write signal from the information processing apparatus 10, and outputs the write data included in the write signal to the storage means 24 and the transmission means 72. The storage means 24 stores the write data. The transmission means 72 temporarily stores the write data in the temporary storage means 25.

At that time, in order to secure the orderliness of the write data, the transmission means 72 performs the packing processing for each write data unit and temporarily stores in the temporary storage means 25. The transmission means 72 creates the writing transmission signal including the packing data with each of transmission destinations of the memory storages 30#1-30#*h*. That is, the transmission means 72 creates the writing transmission signals 1-*h* having the respective transmission destinations of the memory storages 30#1-30#*h*, and transmits to the memory storages 30#1-30#*h*. The transmission means 72 receives writing response signals 1-*h* from the memory storages 30#1-30#*h*. The transmission means 72 eliminates the packing data from the temporary storage means 25 based on the writing response signal which is received the latest from among the writing response signals 1-*h* of the memory storages 30#1-30#*h*. For example, the transmission means 72 receives the writing response signal g (g is an integer of 1 or more, and h or less) from the memory storage 3#*g* the latest, and eliminates the packing data, which was transmitted by the writing transmission signals 1-*h*, from the temporary storage means 25.

Thus, the storage control apparatus 70 stores the write data included in the write signal of the information processing apparatus 10 in the storage means 24 and the memory storages 30#1-30#*h*.

Further, when the monitoring means 23 detects the temporary stored data amount of the temporary storage means 25 having exceeded the predetermined threshold value, the storage control apparatus 70 transmits the job control signal to the information processing apparatuses 10 and lowers the reception frequency of write signals and reduces the temporary stored data amount. At that time, according to this exemplary embodiment, execution of processing of the job which does not include writing process and execution of processing of the job which has high immediacy and execution delay is not permitted are not affected. Therefore, the storage control apparatus 70 of this exemplary embodiment can store the write data relating to the job having high immediacy in the memory storages 30#1-30#*h*.

As above, the storage control apparatus 70 of this exemplary embodiment can reduce deterioration in the processing capacity relating to the job which has high immediacy and is processed by the information processing apparatus 10. The storage control apparatus 70 can store the write data from the information processing apparatus 10 in the memory storages 30#1-30#*h*.

Fifth Exemplary Embodiment

Figure 12:
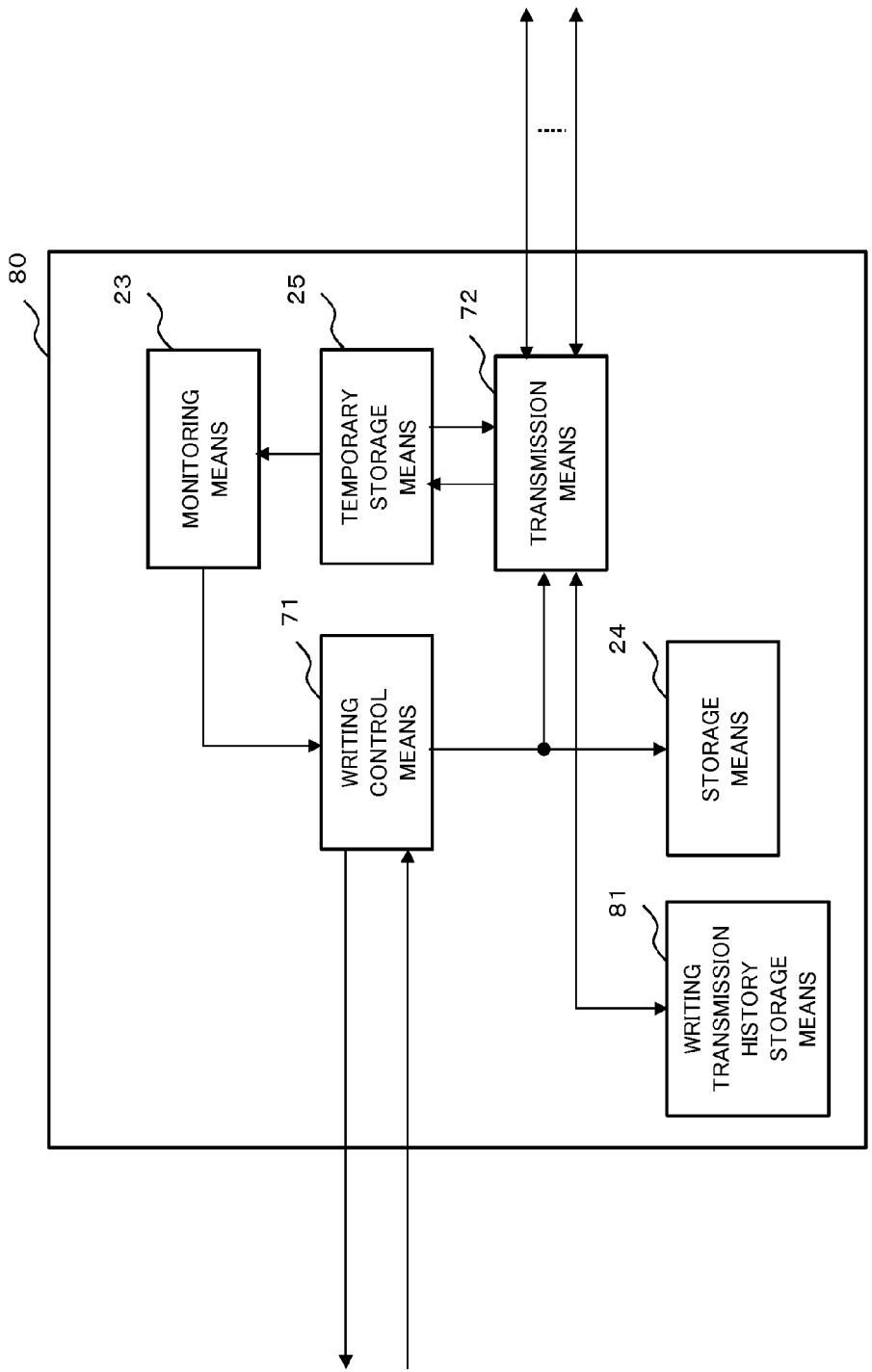
FIG. 12 is a block diagram showing an exemplary configuration of a storage control apparatus of a fifth exemplary embodiment of the present invention.

A fifth exemplary embodiment of the present invention will be described. FIG. 12 is a block diagram showing an exemplary configuration of a storage control apparatus 80 of this exemplary embodiment.

The configuration and operation of the storage control apparatus 80 of this exemplary embodiment will be described with reference to FIG. 12. The storage control apparatus 80 has a configuration identical with FIG. 11 except for a point that the writing transmission history storage means 81 is added to the storage control apparatus 70 described in FIG. 11. Accordingly, the same number and the same name are given to the configuration identical with FIG. 11 and description is omitted, and points of difference will be described.

The transmission means 72 gives predetermined management information to the write data from the information processing apparatus 10, and creates the writing transmission signals 1-h having transmission destinations of the memory storages 30#1-30#h. The transmission means 72 transmits the writing transmission signals 1-h to the memory storages 30#1-30#h. And, the transmission means 72 stores writing response information in the writing transmission history storage means 81 as the writing transmission history information, wherein the writing response information indicates a response state of the writing response signals such as the response time from transmitting the writing transmission signals 1-h to the memory storages 30#1-30#h until receiving each of the writing response signals 1-h, and the contents of the writing response signals 1-h. Here, the contents of the "writing response signal" to be stored in the writing transmission history storage means 81 are, for example, requests of resending.

The transmission means 72 selects a memory storage 30 to which the writing transmission signal is transmitted from among the memory storages 30#1-30#h based on the writing transmission history information stored in the writing transmission history storage means 81.

For example, the transmission means 72 may store the write data by selecting the memory storage 30 in which the response time stored in the writing transmission history storage means 81 is within a predetermined response time. That is, the transmission means 72 judges that, in the memory storage 30 in which the response time is exceeding the predetermined response time, there is a problem in the response time including in communication lines connecting between the storage control apparatus 80 and the memory storage 30. The transmission means 72, based on a result of the judgment, may suspend creation and transmission of the writing transmission signal to the memory storage 30 which has become subject to the judgment result.

Further, the transmission means 72 may store the write data by selecting the memory storage 30 in which the number of times of the retransmission request by the writing response signal stored in the writing transmission history storage means 81 is a predetermined number of times or less. That is, the transmission means 72 judges that, in the memory storage 30 in which the number of the writing response signals requesting resending is more than the predetermined number of times, there is a problem in the communication quality including the communication lines. The transmission means 72, based on a result of the judgment, may suspend creation and transmission of the writing transmission signal to the memory storage 30 which has become subject to the judgment result.

Thus, the storage control apparatus 80 stores the write data included in the write signal of the information processing apparatus 10 in the storage means 24, and stores in the memory storages 30#1-30#h. At that time, the storage control apparatus 80 selects the memory storage 30, to which the writing transmission signal is transmitted, from among the memory storages 30#1-30#h based on the writing transmission history information stored in the writing transmission history storage means 81. The storage control apparatus 80 transmits the writing transmission signal to the selected memory storage 30, and stores the write data. Therefore, because the memory storage 30 which has a problem in the response time and the communication quality can be excluded, the storage control apparatus 80 of this exemplary embodiment can efficiently store the write data of the information processing apparatus 10 in the memory storage 30.

Further, when the monitoring means 23 detects the temporary stored data amount of the temporary storage means 25 having exceeded the predetermined threshold value, the storage control apparatus 80 transmits the job control signal to the information processing apparatuses 10 and lowers the reception frequency of write signals, and reduces the temporary stored data amount. At that time, according to this exemplary embodiment, execution of processing of the job which does not include writing process and execution of processing of the job which has high immediacy and execution delay is not permitted are not affected. Therefore, the storage control apparatus 80 of this exemplary embodiment can store the write data relating to the job having high immediacy in the memory storages 30#1-30#h.

As above, the storage control apparatus 80 of this exemplary embodiment can reduce deterioration in the processing capacity relating to the job which has high immediacy and is processed by the information processing apparatus 10. The storage control apparatus 80 can efficiently store the write data from the information processing apparatus 10 in the memory storages 30.

Further, the present invention is not limited to each above-mentioned embodiment, and can be implemented with various modifications and variations within a range being not deviated from the gist of the present invention.

For example, the storage control apparatus of the present invention may add the writing transmission history storage means 81 described in the fifth exemplary embodiment to the storage control apparatus described in the third exemplary embodiment.

Further, the processing relating to the storage control of each above-mentioned embodiment may be carried out by software using a computer provided in the storage control apparatus, the memory storage or the information processing apparatus of the present invention. That is, the storage control processing may be controlled by a computer program, which performs storage control processing, being read by CPU (Central Processing Unit, which is not shown) and executed. The processing of the same contents as the storage control processing of the above-mentioned embodiment can also be performed even if the storage control processing is controlled by using the program.

Further, the program may be stored in a semiconductor memory apparatus such as ROM (Read Only Memory), RAM (Random Access Memory) and a flash memory or the like, and in a non-temporary medium such as an optical disc, a magnetic disk and a magneto-laser disk or the like.

The invention claimed is:

1. A storage system, comprising:
a storage control apparatus which is provided with
hardware, including a processor and memory;
a transmission unit that is implemented at least by the hardware and that is configured to transmit write data included in a write signal from an external transmission source to a transmission destination,
a temporary storage configured to temporarily store the write data,
a monitor unit that is implemented at least by the hardware and that is configured to monitor a temporary stored data amount that is an amount of the write data stored in the temporary storage, and
a writing controller that is implemented at least by the hardware and that is configured to receive the write signal, to output the write data to the transmission unit, and to transmit a control signal to the transmission source based on a result of the monitoring; and
an information processing apparatus which is provided with
hardware, including a processor and memory;
a processing execution unit that is implemented at least by the hardware and that is configured to execute a job group including jobs and to transmit the write signal including the write data, and
a processing controller that is implemented at least by the hardware and that is configured to select, based on the control signal, a job including writing process which is subject to be suppression of the execution from the job group according to a predetermined condition, and to output a suppression signal which specifies the job including writing process to the processing execution unit,
wherein the processing execution unit, based on the suppression signal, configured to reduce the multiplexed number of the job including writing process among the jobs included the job group, or lowers an execution priority of the job including writing process among the jobs included in the job group.

2. The storage system according to claim 1,
wherein the transmission unit transmits a writing transmission signal, in which transmission destination information is given to the write data, to the transmission destination, and when receiving a writing response signal which notifies of reception of the writing transmission signal at the transmission destination, eliminates the write data stored in the temporary storage unit based on the writing response signal;
wherein the monitor detects whether or not the temporary stored data amount of the write data stored in the temporary storage unit exceeds a predetermined threshold value, and outputs monitoring information including a result of the detection; and
wherein the writing controller transmits the control signal which suppresses the execution based on the monitoring information.

3. The storage system according to claim 1,
wherein the storage control apparatus further comprising a storage configured to store the write data, and
wherein the transmission unit gives predetermined management information to the write data.

4. The storage system according to claim 2,
wherein the storage control apparatus further comprising a writing transmission history storage configured to store writing response information, which indicates a response state of the plurality of writing response signals received from each of the plurality of transmission destinations, wherein the plurality of writing response signals correspond to the plurality of writing transmission signals transmitted from the transmission unit to the plurality of transmission destinations, as writing transmission history information, and
wherein the transmission unit selects from among the plurality of transmission destinations based on the writing transmission history information, and transmits the writing transmission signal to the selected transmission destination.

5. The storage system according to claim 2,
wherein the storage control apparatus further comprising a writing reception history storage unit that is implemented at least by the hardware and that is configured to store writing reception information, which indicates a reception state of the plurality of write signals received by the writing controller from each of the plurality of transmission sources, and process control information, which indicates an implementation state of suppression of the job including writing process to each of the plurality of transmission sources, as writing reception history information, and
wherein the writing controller selects from among the plurality of transmission sources based on the writing reception history information, and transmits the control signal to the selected transmission source.

6. A storage control apparatus, comprising:
hardware, including a processor and memory;
a transmission unit that is implemented at least by the hardware and that is configured to transmit write data included in a write signal from an external transmission source to a transmission destination,
wherein the external transmission source performing execution of first processing, selection of second processing, based on a control signal, which is subject to be suppression of the execution from among the first processing according to a predetermined condition, and suppression of execution of the second processing;
a temporary storage configured to temporarily store the write data;
a monitor unit that is implemented at least by the hardware and that is configured to monitor a temporary stored data amount that is an amount of the write data stored in the temporary storage; and
a writing controller that is implemented at least by the hardware and that is configured to receive the write signal from the transmission source, to output the write data to the transmission unit, and to transmit the control signal to the transmission source based on a result of the monitoring,
wherein the suppression of the execution includes reducing the multiplexed number of processing of the first processing which includes writing process, or lowering an execution priority of the first processing which permits execution delay.

7. An information processing apparatus, comprising:
hardware, including a processor and memory;
a processing execution unit that is implemented at least by the hardware and that is configured to execute first processing, and to transmit a write signal including write data; and
a processing controller that is implemented at least by the hardware and that is configured to select, based on a control signal from an external storage control apparatus, second processing which is subject to be suppression of the execution from among the first processing according to a predetermined condition, and to output a suppression signal which suppresses execution of the second processing to the processing execution unit, wherein the external storage control apparatus including a transmission unit that is implemented at least by the hardware and that is configured to transmit the write data included in the write signal to a transmission destination, a temporary storage unit that is implemented at least by the hardware and that is configured to temporarily store the write data, a monitor configured to monitor a temporary stored data amount that is an amount of the write data stored in the temporary storage, and a writing controller that is implemented at least by the hardware and that is configured to receive the write signal and to output the write data to the transmission unit, and to transmit the control signal to the transmission source based on a result of the monitoring, wherein the suppression of the execution includes reducing the multiplexed number of processing of the first processing which includes writing process, or lowering an execution priority of the first processing which permits execution delay.

8. A non-transitory computer-readable data storage medium storing a storage control program, which when executed by a computer provided in a storage control apparatus including a temporary storage which temporarily stores write data included in a write signal from an external transmission source, causes the computer to operate as the storage control apparatus having a processor of the computer and memory of the computer, the storage control apparatus comprising:

a transmission unit that is implemented at least by the hardware and that is configured to transmit the write data to a transmission destination;

a monitor unit that is implemented at least by the hardware and that is configured to monitor a temporary stored data amount that is an amount of the write data stored in the temporary storage; and a writing controller that is implemented at least by the hardware and that is configured to receive the write signal from the transmission source, which performs execution of first processing, selection of second processing, based on a control signal, which is subject to be suppression of the execution from among the first processing according to a predetermined condition, and suppression of execution of the second processing, and to output the write data to the transmission unit, and to transmit the control signal to the transmission source based on a result of the monitoring, wherein the suppression of the execution includes reducing the multiplexed number of processing of the first processing which includes writing process, or lowering an execution priority of the first processing which permits execution delay.

9. A storage control method that include a storage control apparatus and an information processing apparatus, the method comprising:

the storage control apparatus is provided with
receiving a write signal from the information processing apparatus;
transmitting write data included in the write signal to a transmission destination;
storing the write data temporarily;
monitoring a temporary stored data amount that is an amount of the write data temporarily stored and the information processing apparatus is provided with
transmitting a control signal, based on a result of the monitoring, to the transmission source which performs execution of a job group including jobs;
selecting second processing, based on the control signal, which is subject to be suppression of the execution from the job group according to a predetermined condition;
outputting a suppression signal which specifies the job including writing process; and
suppressing execution of the job including writing process based on the suppression signal, configured to reduce the multiplexed number of the job including writing process among the jobs included in the job group, or lowers an execution priority of the job including writing process among the jobs included the job group, wherein the suppression of the execution includes reducing the multiplexed number of processing of the first processing which includes writing process, or lowering an execution priority of the first processing which permits execution delay.

* * * * *